United States Patent
Khoshnevisan et al.

(10) Patent No.: US 12,349,143 B2
(45) Date of Patent: Jul. 1, 2025

(54) MULTI-TRANSPORT BLOCK UPLINK SHARED CHANNEL TRANSMISSION FEEDBACK MECHANISMS

(71) Applicant: QUALCOMM Incorporated, San Diego, CA (US)

(72) Inventors: Mostafa Khoshnevisan, San Diego, CA (US); Wei Yang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 17/732,341

(22) Filed: Apr. 28, 2022

(65) Prior Publication Data
US 2023/0354339 A1     Nov. 2, 2023

(51) Int. Cl.
*H04W 72/00*     (2023.01)
*H04L 5/00*     (2006.01)
*H04W 72/1268*     (2023.01)
*H04W 72/21*     (2023.01)
*H04W 72/23*     (2023.01)

(52) U.S. Cl.
CPC .......... *H04W 72/21* (2023.01); *H04L 5/0055* (2013.01); *H04W 72/1268* (2013.01); *H04W 72/23* (2023.01)

(58) Field of Classification Search
CPC . H04W 72/21; H04W 72/1268; H04W 72/23; H04L 5/0055; H04L 1/1614
See application file for complete search history.

(56) References Cited

U.S. PATENT DOCUMENTS

| | | | |
|---|---|---|---|
| 2022/0368475 A1* | 11/2022 | Lei | H04L 1/1864 |
| 2022/0394751 A1* | 12/2022 | Myung | H04L 1/18 |
| 2023/0143581 A1* | 5/2023 | Myung | H04W 72/1268 370/329 |

(Continued)

OTHER PUBLICATIONS

Samsung (Enhancements for unlicensed band URLLC/IIoT, 3GPP Draft; RI-2106881, Aug. 2021).*

(Continued)

*Primary Examiner* — Lakeram Jangbahadur
(74) *Attorney, Agent, or Firm* — Paul M. McAdams; Holland & Hart LLP

(57) ABSTRACT

Methods, systems, and devices for wireless communications are described. In some aspects, a user equipment (UE) and a network entity may support feedback-related signaling designs that support a feedback mechanism for uplink data transmissions that use or include multiple transport blocks (TBs). The UE may transmit a data message including multiple TBs and a feedback process identifier (ID) corresponding to the data message may be associated with the multiple TBs. If the data message is a configured grant (CG) physical uplink shared channel (PUSCH) transmission, the UE may multiplex uplink control information (UCI) with the data message that indicates feedback-related information for each of the multiple TBs. The network entity may attempt to decode the data message including the multiple TBs and may generate downlink feedback information (DFI) based on whether the network entity successfully decodes one or more of the multiple TBs.

23 Claims, 16 Drawing Sheets

(56) References Cited

U.S. PATENT DOCUMENTS

2023/0345468 A1* 10/2023 He .................... H04W 72/1268

OTHER PUBLICATIONS

Samsung098 (Configured grant enhancement for NR-U, R1-2006098, Aug. 2020).*
Partial International Search Report—PCT/US2023/020160—ISA/EPO—Jul. 24, 2023 (2203647WO).
Samsung: "Configured Grant Enhancement for NR-U", 3GPP TSG RAN WG1 #102-e, R1-2006098, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020, 4 Pages, XP052347472, p. 1, Section 2, Par. 1.
Samsung: "Enhancements for Unlicensed Band URLLC/IIoT", 3GPP TSG RAN WG1 #106-e, R1-2106881, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 6, 2021, pp. 1-6, XP052033320, p. 1, Agreement item 1, subitem 1, p. 1, Agreement, Option 1, last item, parts 1-2, p. 1, section 1, first par, p. 5, 1st list item after Proposal 4, parts 1-2.
International Search Report and Written Opinion—PCT/US2023/020160—ISA/EPO—Sep. 14, 2023 (2203647WO).

* cited by examiner

MULTI-TRANSPORT BLOCK UPLINK SHARED CHANNEL TRANSMISSION FEEDBACK MECHANISMS

INTRODUCTION

The following relates to wireless communications, including multi-transport block (TB) uplink shared channel transmission feedback mechanisms.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-transport block (TB) uplink shared channel transmission feedback mechanisms. For example, the described techniques provide for signaling designs and feedback mechanisms for transmissions of data messages, such as physical uplink shared channel (PUSCH) transmissions, that use or include multiple TBs. For example, a user equipment (UE), which may be referred to herein as a network node, may transmit a data message using or including multiple TBs and may include, in the data message, a feedback process identifier (ID) associated with the multiple TBs. A network entity, which also may be referred to herein as a network node, may receive the data message including the multiple TBs and may transmit, via downlink feedback information (DFI), feedback to the UE associated with the data message. In some aspects, the UE and the network entity may support a mutually understood DFI format or DFI interpretation rule associated with the multiple TBs such that the UE is able to detect whether the network entity successfully decoded one or more of the multiple TBs included in the data message. Additionally, in some aspects, the UE may multiplex uplink control information (UCI) with the data message and the UE and the network entity may support a multi-TB associated UCI format that includes a new data indicator (NDI) field and a redundancy version (RV) field for each of the multiple TBs used for or included in the data message.

A method for wireless communication at a first network node is described. The method may include receiving, from a second network node, information that indicates that the first network node is to transmit a data message using a set of multiple TBs, where the set of multiple TBs includes a first TB and a second TB, transmitting, to the second network node based on the information, the data message using the set of multiple TBs, where the data message includes a feedback process ID associated with the set of multiple TBs, and receiving, from the second network node, DFI corresponding to the feedback process ID.

An apparatus for wireless communication at a first network node is described. The apparatus may include at least one processor, memory coupled with the at least one processor, and instructions stored in the memory. The instructions may be executable by the at least one processor to cause the apparatus to receive, from a second network node, information that indicates that the first network node is to transmit a data message using a set of multiple TBs, where the set of multiple TBs includes a first TB and a second TB, transmit, to the second network node based on the information, the data message using the set of multiple TBs, where the data message includes a feedback process ID associated with the set of multiple TBs, and receive, from the second network node, DFI corresponding to the feedback process ID.

Another apparatus for wireless communication at a first network node is described. The apparatus may include means for receiving, from a second network node, information that indicates that the first network node is to transmit a data message using a set of multiple TBs, where the set of multiple TBs includes a first TB and a second TB, means for transmitting, to the second network node based on the information, the data message using the set of multiple TBs, where the data message includes a feedback process ID associated with the set of multiple TBs, and means for receiving, from the second network node, DFI corresponding to the feedback process ID.

A non-transitory computer-readable medium storing code for wireless communication at a first network node is described. The code may include instructions executable by at least one processor to receive, from a second network node, information that indicates that the first network node is to transmit a data message using a set of multiple TBs, where the set of multiple TBs includes a first TB and a second TB, transmit, to the second network node based on the information, the data message using the set of multiple TBs, where the data message includes a feedback process ID associated with the set of multiple TBs, and receive, from the second network node, DFI corresponding to the feedback process ID.

In some examples of the method, apparatuses, and non-transitory computer-readable medium described herein, receiving the DFI may include operations, features, means, or instructions for receiving downlink control information (DCI) including the DFI, where the DFI includes a first bit corresponding to the feedback process ID, and where the first bit indicates first feedback exclusively corresponding to the first TB.

In some examples of the method, apparatuses, and non-transitory computer-readable medium described herein, the DFI may be a 16-bit bitmap, the 16-bit bitmap includes the first bit, and the 16-bit bitmap excludes any feedback corresponding to the second TB.

In some examples of the method, apparatuses, and non-transitory computer-readable medium described herein, receiving the DFI may include operations, features, means, or instructions for receiving DCI including the DFI, where the DFI includes a first bit corresponding to the feedback process ID, and where the first bit indicates first feedback corresponding to the first TB and second feedback corresponding to the second TB.

In some examples of the method, apparatuses, and non-transitory computer-readable medium described herein, the first bit may be a first value or a second value, the first value indicates the first feedback and the second feedback may be each a respective acknowledgement (ACK), and the second value indicates at least one of the first feedback or the second feedback may be a negative acknowledgement (NACK).

In some examples of the method, apparatuses, and non-transitory computer-readable medium described herein, the DFI includes a set of multiple bits, the set of multiple bits includes the first bit, each respective bit of the set of multiple bits corresponds to a respective feedback process ID of a set of multiple feedback process IDs, the set of multiple feedback process IDs includes the feedback process ID associated with the set of multiple TBs, and the set of multiple feedback process IDs may be all different.

In some examples of the method, apparatuses, and non-transitory computer-readable medium described herein, the first bit corresponds to a logical AND operation between the first feedback and the second feedback.

In some examples of the method, apparatuses, and non-transitory computer-readable medium described herein, the first bit corresponds to a logical OR operation between the first feedback and the second feedback.

In some examples of the method, apparatuses, and non-transitory computer-readable medium described herein, receiving the DFI may include operations, features, means, or instructions for receiving DCI including the DFI, where the DFI includes a set of multiple bits corresponding to the feedback process ID, where each respective bit of the set of multiple bits indicates respective feedback corresponding to each respective TB of the set of multiple TBs.

In some examples of the method, apparatuses, and non-transitory computer-readable medium described herein, a first bit of the set of multiple bits indicates first feedback corresponding to the first TB and a second bit of the set of multiple bits indicates second feedback corresponding to the second TB.

In some examples of the method, apparatuses, and non-transitory computer-readable medium described herein, the DFI may be a 32-bit bitmap including the set of multiple bits and the 32-bit bitmap includes the first bit and the second bit.

In some examples of the method, apparatuses, and non-transitory computer-readable medium described herein, the set of multiple bits includes multiple sets of bits, each respective set of bits of the multiple sets of bits corresponds to a respective feedback process ID of a set of multiple feedback process IDs, the set of multiple feedback process IDs includes the feedback process ID associated with the set of multiple TBs, and the set of multiple feedback process IDs may be all different.

In some examples of the method, apparatuses, and non-transitory computer-readable medium described herein, the second bit may be a null value or a default value; or the first network node ignores the second bit.

In some examples of the method, apparatuses, and non-transitory computer-readable medium described herein, a DCI format associated with both the DCI including the DFI and a scheduling DCI may have a fixed size, the DCI including the DFI includes a first quantity of bits, the scheduling DCI includes a second quantity of bits, and the fixed size may be equal to a greater of the first quantity of bits and the second quantity of bits.

In some examples of the method, apparatuses, and non-transitory computer-readable medium described herein, the set of multiple bits includes the multiple sets of bits if a scheduling DCI includes a quantity of bits equal to or greater than a total quantity of bits of the DCI including the multiple sets of bits.

Some examples of the method, apparatuses, and non-transitory computer-readable medium described herein may further include operations, features, means, or instructions for receiving, from the second network node, configuration information via radio resource control (RRC) signaling and processing, based on the configuration information, the DFI.

Some examples of the method, apparatuses, and non-transitory computer-readable medium described herein may further include operations, features, means, or instructions for transmitting UCI associated with the data message, where the UCI includes a set of multiple NDI fields and a set of multiple RV fields, where a respective NDI field of the set of multiple NDI fields and a respective RV field of the set of multiple RV fields correspond to a respective TB of the set of multiple TBs.

Some examples of the method, apparatuses, and non-transitory computer-readable medium described herein may further include operations, features, means, or instructions for encoding the UCI to obtain a single UCI message including the set of multiple NDI fields and the set of multiple RV fields, where transmitting the UCI includes transmitting the single UCI message.

Some examples of the method, apparatuses, and non-transitory computer-readable medium described herein may further include operations, features, means, or instructions for multiplexing the single UCI message on one or more layers associated with one TB of the set of multiple TBs, where transmitting the UCI includes transmitting the single UCI message on the one or more layers.

Some examples of the method, apparatuses, and non-transitory computer-readable medium described herein may further include operations, features, means, or instructions for multiplexing the single UCI message on a first set of one or more layers associated with the first TB of the set of multiple TBs and on a second set of one or more layers associated with the second TB of the set of multiple TBs, where transmitting the UCI includes transmitting the single UCI message on the first set of one or more layers and on the second set of one or more layers.

Some examples of the method, apparatuses, and non-transitory computer-readable medium described herein may further include operations, features, means, or instructions for encoding the UCI to obtain a set of multiple UCI messages, where the set of multiple UCI messages includes a first UCI message and a second UCI message, where the first UCI message includes a first NDI field of the set of multiple NDI fields and a first RV field of the set of multiple RV fields, and where the second UCI message includes a second NDI field of the set of multiple NDI fields and a second RV field of the set of multiple RV fields and multiplexing the first UCI message on a first set of one or more layers associated with the first TB and the second UCI message on a second set of one or more layers associated with the second TB, where transmitting the UCI includes transmitting the first UCI message on the first set of one or more layers and the second UCI message on the second set of one or more layers.

In some examples of the method, apparatuses, and non-transitory computer-readable medium described herein, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB includes the second RV field, the second NDI field, a second feedback process ID field, and a second channel occupancy time sharing information field, where the second feedback process ID field and the second channel occupancy time sharing information field include same information as the first feedback process ID field and the first channel occupancy time sharing information field, respectively.

In some examples of the method, apparatuses, and non-transitory computer-readable medium described herein, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB exclusively includes the second RV field and the second NDI field.

In some examples of the method, apparatuses, and non-transitory computer-readable medium described herein, the data message may be a configured grant physical uplink shared channel (CG-PUSCH) transmission or a dynamic grant physical uplink shared channel (DG-PUSCH) transmission.

A method for wireless communication at a first network node is described. The method may include transmitting, to a second network node, information that indicates that the second network node is to transmit a data message using a set of multiple TBs, where the set of multiple TBs includes a first TB and a second TB, receiving, from the second network node based on the information, the data message including the set of multiple TBs, where the data message includes a feedback process ID associated with the set of multiple TBs, and transmitting, to the second network node, DFI corresponding to the feedback process ID.

An apparatus for wireless communication at a first network node is described. The apparatus may include at least one processor, memory coupled with the at least one processor, and instructions stored in the memory. The instructions may be executable by the at least one processor to cause the apparatus to transmit, to a second network node, information that indicates that the second network node is to transmit a data message using a set of multiple TBs, where the set of multiple TBs includes a first TB and a second TB, receive, from the second network node based on the information, the data message including the set of multiple TBs, where the data message includes a feedback process ID associated with the set of multiple TBs, and transmit, to the second network node, DFI corresponding to the feedback process ID.

Another apparatus for wireless communication at a first network node is described. The apparatus may include means for transmitting, to a second network node, information that indicates that the second network node is to transmit a data message using a set of multiple TBs, where the set of multiple TBs includes a first TB and a second TB, means for receiving, from the second network node based on the information, the data message including the set of multiple TBs, where the data message includes a feedback process ID associated with the set of multiple TBs, and means for transmitting, to the second network node, DFI corresponding to the feedback process ID.

A non-transitory computer-readable medium storing code for wireless communication at a first network node is described. The code may include instructions executable by at least one processor to transmit, to a second network node, information that indicates that the second network node is to transmit a data message using a set of multiple TBs, where the set of multiple TBs includes a first TB and a second TB, receive, from the second network node based on the information, the data message including the set of multiple TBs, where the data message includes a feedback process ID associated with the set of multiple TBs, and transmit, to the second network node, DFI corresponding to the feedback process ID.

In some examples of the method, apparatuses, and non-transitory computer-readable medium described herein, transmitting the DFI may include operations, features, means, or instructions for transmitting DCI including the DFI, where the DFI includes a first bit corresponding to the feedback process ID, and where the first bit indicates first feedback exclusively corresponding to the first TB.

In some examples of the method, apparatuses, and non-transitory computer-readable medium described herein, the DFI may be a 16-bit bitmap, the 16-bit bitmap includes the first bit, and the 16-bit bitmap excludes any feedback corresponding to the second TB.

In some examples of the method, apparatuses, and non-transitory computer-readable medium described herein, transmitting the DFI may include operations, features, means, or instructions for transmitting DCI including the DFI, where the DFI includes a first bit corresponding to the feedback process ID, and where the first bit indicates first feedback corresponding to the first TB and second feedback corresponding to the second TB.

In some examples of the method, apparatuses, and non-transitory computer-readable medium described herein, the first bit may be a first value or a second value, the first value indicates the first feedback and the second feedback may be each a respective ACK, and the second value indicates at least one of the first feedback or the second feedback may be a NACK.

In some examples of the method, apparatuses, and non-transitory computer-readable medium described herein, the DFI includes a set of multiple bits, the set of multiple bits includes the first bit, each respective bit of the set of multiple bits corresponds to a respective feedback process ID of a set of multiple feedback process IDs, the set of multiple feedback process IDs includes the feedback process ID associated with the set of multiple TBs, and the set of multiple feedback process IDs may be all different.

In some examples of the method, apparatuses, and non-transitory computer-readable medium described herein, the first bit corresponds to a logical AND operation between the first feedback and the second feedback.

In some examples of the method, apparatuses, and non-transitory computer-readable medium described herein, the first bit corresponds to a logical OR operation between the first feedback and the second feedback.

In some examples of the method, apparatuses, and non-transitory computer-readable medium described herein, transmitting the DFI may include operations, features, means, or instructions for transmitting DCI including the DFI, where the DFI includes a set of multiple bits corresponding to the feedback process ID, where each respective bit of the set of multiple bits indicates respective feedback corresponding to each respective TB of the set of multiple TBs.

In some examples of the method, apparatuses, and non-transitory computer-readable medium described herein, a first bit of the set of multiple bits indicates first feedback corresponding to the first TB and a second bit of the set of multiple bits indicates second feedback corresponding to the second TB.

In some examples of the method, apparatuses, and non-transitory computer-readable medium described herein, the DFI may be a 32-bit bitmap including the set of multiple bits and the 32-bit bitmap includes the first bit and the second bit.

In some examples of the method, apparatuses, and non-transitory computer-readable medium described herein, the set of multiple bits includes multiple sets of bits, each respective set of bits of the multiple sets of bits corresponds to a respective feedback process ID of a set of multiple feedback process IDs, the set of multiple feedback process IDs includes the feedback process ID associated with the set of multiple TBs, and the set of multiple feedback process IDs may be all different.

In some examples of the method, apparatuses, and non-transitory computer-readable medium described herein, the second bit may be a null value or a default value; or the second network node may be to ignore the second bit.

In some examples of the method, apparatuses, and non-transitory computer-readable medium described herein, a DCI format associated with both the DCI including the DFI and a scheduling DCI may have a fixed size, the DCI including the DFI includes a first quantity of bits, the scheduling DCI includes a second quantity of bits, and the fixed size may be equal to a greater of the first quantity of bits and the second quantity of bits.

In some examples of the method, apparatuses, and non-transitory computer-readable medium described herein, the set of multiple bits includes the multiple sets of bits if a scheduling DCI includes a quantity of bits equal to or greater than a total quantity of bits of the DCI including the multiple sets of bits.

Some examples of the method, apparatuses, and non-transitory computer-readable medium described herein may further include operations, features, means, or instructions for transmitting, from the second network node, configuration information via RRC signaling, where the configuration information may be associated with the DFI.

Some examples of the method, apparatuses, and non-transitory computer-readable medium described herein may further include operations, features, means, or instructions for receiving UCI associated with the data message, where the UCI includes a set of multiple NDI fields and a set of multiple RV fields, where a respective NDI field of the set of multiple NDI fields and a respective RV field of the set of multiple RV fields correspond to a respective TB of the set of multiple TBs.

In some examples of the method, apparatuses, and non-transitory computer-readable medium described herein, the UCI may be a single UCI message and the method, apparatuses, and non-transitory computer-readable medium may include further operations, features, means, or instructions for decoding the UCI to obtain the single UCI message including the set of multiple NDI fields and the set of multiple RV fields.

Some examples of the method, apparatuses, and non-transitory computer-readable medium described herein may further include operations, features, means, or instructions for demultiplexing the single UCI message from one or more layers associated with one TB of the set of multiple TBs, where receiving the UCI includes receiving the single UCI message on the one or more layers.

Some examples of the method, apparatuses, and non-transitory computer-readable medium described herein may further include operations, features, means, or instructions for demultiplexing the single UCI message from a first set of one or more layers associated with the first TB of the set of multiple TBs and from a second set of one or more layers associated with the second TB of the set of multiple TBs, where receiving the UCI includes receiving the single UCI message on the first set of one or more layers and on the second set of one or more layers.

In some examples of the method, apparatuses, and non-transitory computer-readable medium described herein, the UCI may be a set of multiple UCI messages and the method, apparatuses, and non-transitory computer-readable medium may include further operations, features, means, or instructions for decoding the UCI to obtain the set of multiple UCI messages, where the set of multiple UCI messages includes a first UCI message and a second UCI message, where the first UCI message includes a first NDI field of the set of multiple NDI fields and a first RV field of the set of multiple RV fields, and where the second UCI message includes a second NDI field of the set of multiple NDI fields and a second RV field of the set of multiple RV fields and demultiplexing the first UCI message on a first set of one or more layers associated with the first TB and the second UCI message on a second set of one or more layers associated with the second TB, where receiving the includes receiving the first UCI message on the first set of one or more layers and the second UCI message on the second set of one or more layers.

In some examples of the method, apparatuses, and non-transitory computer-readable medium described herein, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB includes the second RV field, the second NDI field, a second feedback process ID field, and a second channel occupancy time sharing information field, where the second feedback process ID field and the second channel occupancy time sharing information field include same information as the first feedback process ID field and the first channel occupancy time sharing information field, respectively.

In some examples of the method, apparatuses, and non-transitory computer-readable medium described herein, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB exclusively includes the second RV field and the second NDI field.

In some examples of the method, apparatuses, and non-transitory computer-readable medium described herein, the data message may be a CG-PUSCH transmission or a DG-PUSCH transmission.

DETAILED DESCRIPTION

Figure 1:
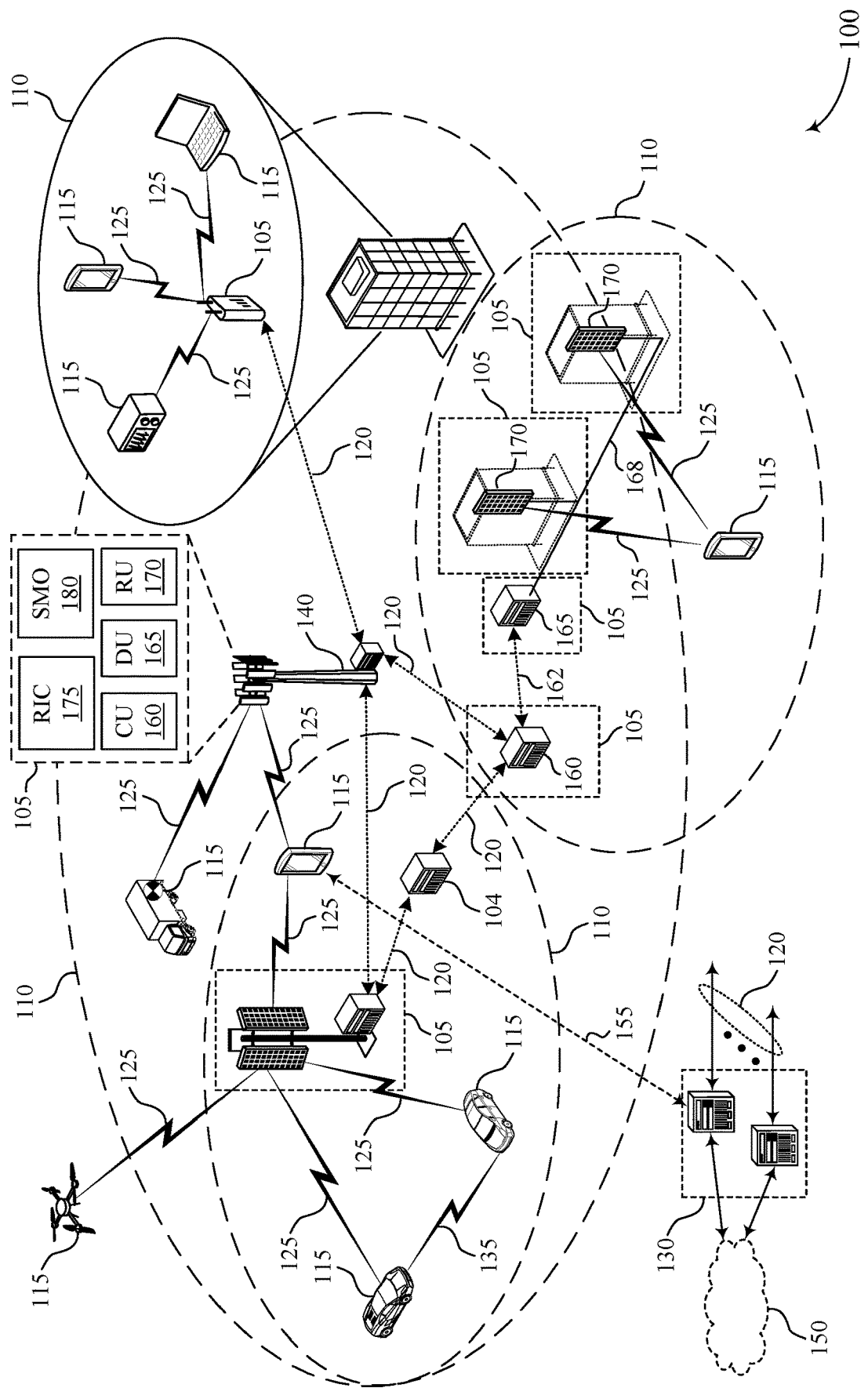
FIGS. 1 and 2 show examples of wireless communications systems that support multi-transport block (TB) uplink shared channel transmission feedback mechanisms in accordance with one or more aspects of the present disclosure.

In some wireless communications systems, a user equipment (UE), which may be an example of a network node, may perform an uplink data transmission to a network entity, which may be another example of a network node, via a physical uplink shared channel (PUSCH). The network entity may dynamically or non-dynamically schedule the PUSCH transmission, where a dynamically scheduled PUSCH may be scheduled via a dynamic grant (DG) and referred to as a DG-PUSCH and a non-dynamically scheduled PUSCH may be scheduled, at least in part, via radio resource control (RRC) signaling and referred to as a configured grant (CG) PUSCH. For either or both of DG-PUSCH transmissions and CG-PUSCH transmissions, the network entity may attempt to decode the data and may transmit, to the UE, feedback indicating whether the data was successfully or unsuccessfully decoded by the network entity. To convey the feedback for a DG-PUSCH or CG-PUSCH transmission, the network entity may include a single bit in a downlink feedback information (DFI) field of a downlink control information (DCI) message that corresponds to the DG-PUSCH or CG-PUSCH. Further, to support feedback for a CG-PUSCH transmission, the UE may multiplex uplink control information (UCI) with the CG-PUSCH and the UCI may indicate a hybrid automatic repeat request (HARQ) process ID and other information associated with the CG-PUSCH that the network entity may use when providing feedback for the CG-PUSCH.

Such a feedback mechanism for DG-PUSCH and CG-PUSCH transmissions may be designed for indicating feedback for DG-PUSCH and CG-PUSCH transmissions that are associated with a single codeword or a single transport block (TB). For example, some DCI formats may provide enough bits for a DFI field to indicate feedback for one codeword or TB per PUSCH transmission and some UCI formats may provide enough bits to indicate information about one codeword or TB of an associated PUSCH, but no more. In some systems, however, a UE may use multiple codewords and multiple TBs for a DG-PUSCH or CG-PUSCH transmission. As such, a feedback mechanism designed for a single codeword or a single TB may result in ambiguity or uncertainty between the UE and a network entity as to whether, or how much of, a given DG-PUSCH or CG-PUSCH transmission was successfully decoded at the network entity.

In some implementations of the present disclosure, a UE and a network entity may support a signaling design that enables a feedback mechanism associated with DG-PUSCH or CG-PUSCH transmissions that include or use multiple codewords or TBs. For example, the UE may receive one or both of RRC signaling and DCI scheduling or activating a data message to be transmitted from the UE to the network entity and the RRC signaling or DCI may indicate that the UE is to use at least a first TB and a second TB to transmit the data message, where a HARQ process ID of the data message is associated with both TBs. In implementations in which the data message is a DG-PUSCH transmission or a CG-PUSCH transmission, the UE may transmit the data message and may receive DFI corresponding to the HARQ process ID of the data message (e.g., the HARQ process ID that is associated with both TBs). In some aspects, the DFI may include a single bit corresponding to the HARQ process ID and the UE and the network entity may support a mutually understood rule for interpreting the feedback indicated by the single bit. In some other aspects, the DFI may include multiple bits (e.g., two bits) corresponding to the HARQ process ID and the UE and the network entity may support a mutually understood rule according to which a first bit provides first feedback for the first TB and a second bit provides second feedback for the second TB.

Further, in implementations in which the data message is a CG-PUSCH transmission, the UE may multiplex UCI (e.g., CG-UCI) with the CG-PUSCH and the UE and the network entity may support a UCI format based on the data message including or using multiple TBs. In some aspects, for example, the UCI may include a respective new data indicator (NDI) field and a respective redundancy version (RV) field for each of the first TB and the second TB. For instance, the UE may include a first NDI field and a first RV field in the UCI that correspond to the first TB and may include a second NDI field and a second RV field in the UCI that correspond to the second TB. The UE may encode the UCI to indicate the multiple NDI and RV fields via a single UCI message or to distribute the multiple NDI and RV fields across multiple UCI messages.

Particular implementations of the subject matter described in this disclosure can be implemented to realize one or more of the following potential advantages. For example, as a result of supporting a mutually understood rule for interpreting DFI that is associated with multiple TBs or supporting a DFI design that carries multiple bits for a HARQ process ID (such that the DFI indicates separate feedback for each TB associated with a given PUSCH transmission), the UE may more accurately determine whether, or how much of, a multi-TB PUSCH transmission the network entity was able to successful decode. As such, the UE may more accurately determine whether to perform a retransmission (either a partial or a complete retransmission) of the PUSCH transmission, which may result in greater reliability and a higher likelihood for successful communication between the UE and the network entity as well as less signaling overhead and lower latency. Further, in implementations in which the UE multiplexes UCI with a CG-PUSCH transmission that is associated with multiple TBs, the described UCI formatting techniques may provide the network entity with greater feedback-associated information for each of the multiple TBs associated with the CG-PUSCH transmission, which may enable the network entity to provide more relevant and accurate feedback for the CG-PUSCH transmission. As such, the UE and the network entity may achieve higher data rates, greater spectral efficiency, and greater system capacity, among other benefits.

Aspects of the disclosure are initially described in the context of wireless communications systems. Aspects of the disclosure are additionally illustrated by and described with reference to UCI signaling designs, a communication timeline, and a process flow. Aspects of the disclosure are further illustrated by and described with reference to apparatus diagrams, system diagrams, and flowcharts that relate to multi-TB uplink shared channel transmission feedback mechanisms.

FIG. 1 shows an example of a wireless communications system 100 that supports multi-TB uplink shared channel transmission feedback mechanisms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node. Further, a network node (one or both of the first network node and the second network node) may include or otherwise be associated with multiple components (e.g., as part of an open RAN (O-RAN) or disaggregated RAN (D-RAN) deployment). In such aspects in which the network node includes or is otherwise associated with multiple components, and if the network node is configured to transmit or receive information, such transmission of information may include providing, sending, outputting, or indicating the information from a first component to one or more other components of the network node and such reception of information may include obtaining, decoding, ascertaining, sensing, determining, or identifying the information at a first component from one or more other components of the network node.

Such transmission or reception of information may include wireless transmission or reception or wired transmission or reception.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an O-RAN (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (MC) 175 (e.g., a Near-Real Time MC (Near-RT RIC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multi-TB uplink shared channel transmission feedback mechanisms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. HARQ feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some wireless communications systems, a UE 115, which may be an example of a network node, may perform an uplink data transmission to a network entity 105, which may be another example of a network node, via a PUSCH. The network entity 105 may dynamically or non-dynamically schedule the PUSCH transmission, where a dynamically scheduled PUSCH may be scheduled via a DG and referred to as a DG-PUSCH and a non-dynamically scheduled PUSCH may be scheduled, at least in part, via RRC signaling and referred to as a CG-PUSCH. For either or both of DG-PUSCH transmissions and CG-PUSCH transmissions, the network entity 105 may attempt to decode the data and may transmit, to the UE 115, feedback indicating whether the data was successfully or unsuccessfully decoded by the network entity 105. To convey the feedback for a DG-PUSCH or CG-PUSCH transmission, the network entity 105 may include a single bit in a DFI field of a DCI message that corresponds to the DG-PUSCH or CG-PUSCH. Further, to support feedback for a CG-PUSCH transmission, the UE 115 may multiplex UCI with the CG-PUSCH and the UCI may indicate the HARQ process ID and other information about the CG-PUSCH that the network entity 105 may use when providing feedback for the CG-PUSCH.

Such a feedback mechanism for DG-PUSCH and CG-PUSCH transmissions may be designed for indicating feedback for DG-PUSCH and CG-PUSCH transmissions that are associated with a single codeword or a single TB. For example, some DCI formats may provide enough bits for a DFI field to indicate feedback for one codeword or TB per PUSCH transmission and some UCI formats may provide enough bits to indicate information about one codeword or TB of an associated PUSCH, but no more. In some systems, however, a UE 115 may use multiple codewords and multiple TBs for a DG-PUSCH or CG-PUSCH transmission. As such, a feedback mechanism designed for a single codeword or a single TB may result in ambiguity or uncertainty between the UE 115 and a network entity 105 as to whether, or how much of, a given DG-PUSCH or CG-PUSCH transmission was successfully decoded at the network entity 105.

In some implementations of the present disclosure, a UE 115 and a network entity 105 may support signaling designs and a feedback mechanism associated with DG-PUSCH or CG-PUSCH transmissions that include or use multiple codewords or TBs. For example, the UE 115 may receive one or both of RRC signaling and DCI scheduling or activating a data message to be transmitted from the UE 115 to the network entity 105 and the RRC signaling or DCI may indicate that the UE 115 is to use at least a first TB and a second TB to transmit the data message, where a HARQ process ID of the data message is associated with both TBs.

In implementations in which the data message is a DG-PUSCH transmission or a CG-PUSCH transmission, the UE 115 may transmit the data message and may receive DFI corresponding to the HARQ process ID of the data message (e.g., the HARQ process ID that is associated with both TBs). In some aspects, the DFI may include a single bit corresponding to the HARQ process ID and the UE 115 and the network entity 105 may support a mutually understood rule for interpreting the feedback indicated by the single bit. In some other aspects, the DFI may include multiple bits (e.g., two bits) corresponding to the HARQ process ID and the UE 115 and the network entity 105 may support a mutually understood rule according to which a first bit indicates first feedback for the first TB and a second bit indicates second feedback for the second TB.

Further, in implementations in which the data message is a CG-PUSCH transmission, the UE 115 may multiplex UCI (e.g., CG-UCI) with the CG-PUSCH and the UE 115 and the network entity 105 may support a UCI format that is associated with the data message including or using multiple TBs. In some aspects, for example, the UCI may include a respective NDI field and a respective RV field for each of the first TB and the second TB. For instance, the UE 115 may include a first NDI field and a first RV field in the UCI that correspond to the first TB and may include a second NDI field and a second RV field in the UCI that correspond to the second TB. The UE 115 may encode the UCI to indicate the multiple NDI and RV fields via a single UCI message or to distribute the multiple NDI and RV fields across multiple UCI messages.

As described herein, a codeword may represent information before it is formatted for transmission. Further, a codeword may be defined as an information block that may be appended with a CRC. Each codeword may be separately encoded and separately decoded. In some aspects, one codeword may correspond to one TB. For example, the UE 115 and the network entity 105 may support a one-to-one mapping between a codeword and a TB. As such, a multi-codeword data message may be equivalently understood or referred to as a multi-TB data message, where each codeword and TB of the multiple codewords and TBs may be separately encoded and separately decoded.

Figure 2:
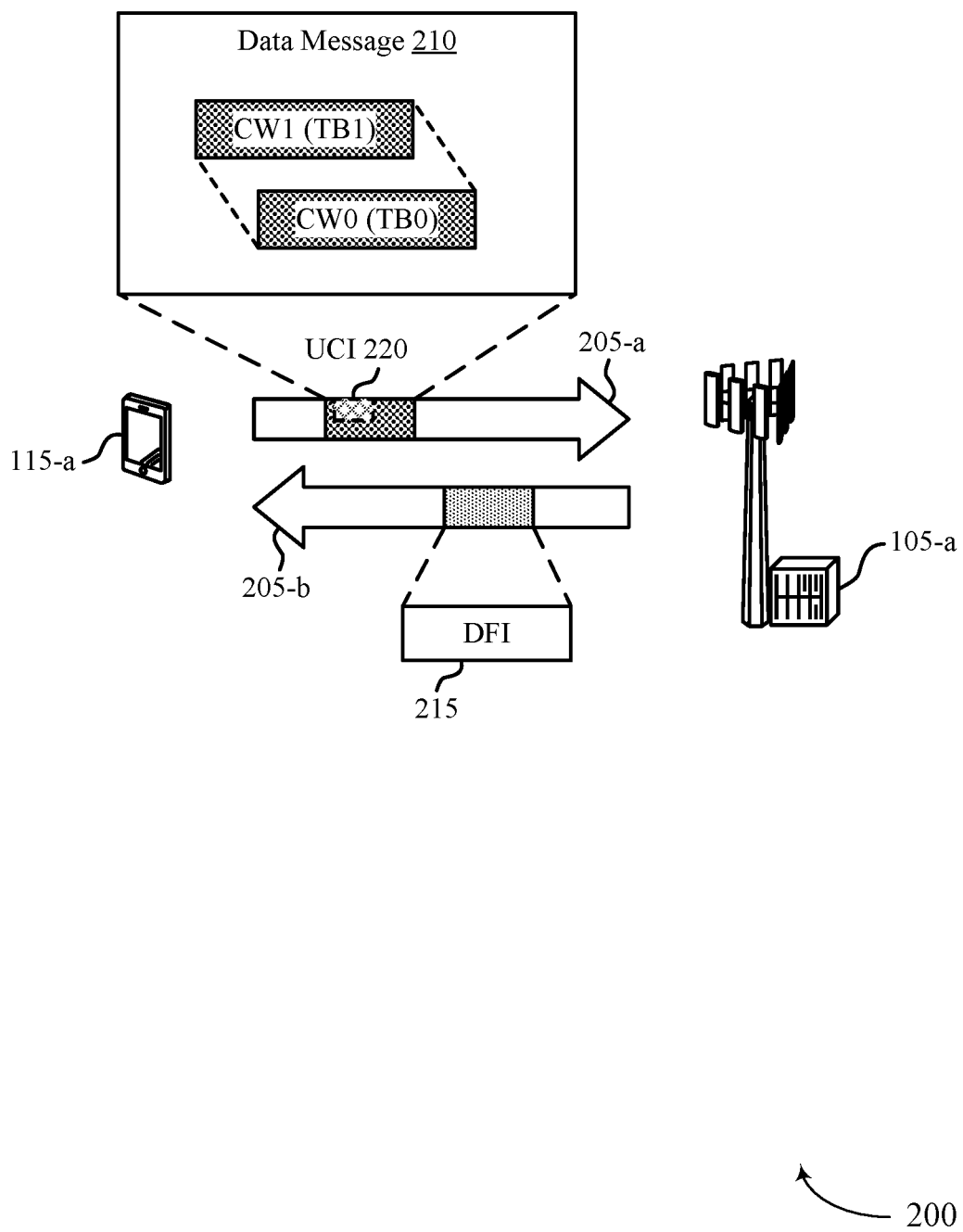

FIG. 2 shows an example of a wireless communications system 200 that supports multi-TB uplink shared channel transmission feedback mechanisms in accordance with one or more aspects of the present disclosure. In some examples, the wireless communications system 200 may implement aspects of the wireless communications system 100. For example, the wireless communications system 200 may include a network entity 105-*a* and a UE 115-*a*, which may be examples of the corresponding devices as illustrated by and described with reference to FIG. 1. The UE 115-*a* and the network entity 105-*a* may communicate via a communication link 205, which may generally refer to one or both of an uplink 205-*a* and a downlink 205-*b*, and the UE 115-*a* may transmit one or more data messages 210 to the network entity 105-*b* via one or more DG-PUSCH or CG-PUSCH transmissions. In some aspects, the UE 115-*a* and the network entity 105-*a* may support signaling designs and a feedback mechanism that support scenarios in which the UE 115-*a* transmits a data message 210 using multiple TBs and multiple codewords.

For example, the UE 115-*a* may transmit the data message 210 to the network entity 105-*a* via a DG-PUSCH transmission or a CG-PUSCH transmission. A CG-PUSCH may be referred to as or an example of a Type 1 CG and may be exclusively RRC configured and a DG-PUSCH may be referred to as or an example of a Type 2 CG and may be DCI activated (e.g., for a Type 2 CG-PUSCH, some information may be RRC configured and some other information may be indicated via an activating DCI). Additional details relating to DG-PUSCHs and CG-PUSCHs are illustrated by and described with reference to FIG. 5.

In aspects in which the UE 115-a transmits the data message 210 via a DG-PUSCH or a CG-PUSCH, the network entity 105-a may receive and attempt to decode the data message 210. The network entity 105-a may transmit feedback to the UE 115-a associated with the data message 210 via DFI 215 (which may sometimes be equivalently referred to as CG-DFI). For example, the DFI 215 may indicate HARQ-ACK for each HARQ ID of a previous set of one or more PUSCH transmissions from the UE 115-a to the network entity 105-a. As described herein, feedback and HARQ-ACK may refer to information indicative of whether or not a receiving device (e.g., the network entity 105-a) successfully decoded a transmission. In scenarios in which the network entity 105-a successfully decodes a transmission, the network entity 105-a may indicate an acknowledgement (ACK) via the feedback or HARQ-ACK information. In scenarios in which the network entity 105-a fails to successfully decode a transmission, the network entity 105-a may indicate a negative ACK (NACK) via the feedback or HARQ-ACK information. As such, feedback or HARQ-ACK information may indicate an ACK or a NACK for a given transmission and the UE 115-a may identify or determine to which transmission an ACK or a NACK corresponds based on a HARQ ID (e.g., a HARQ process ID) associated with that ACK or NACK (where such an association may be defined by a mapping rule and bitmap).

For example, the network entity 105-a may transmit the DFI 215 in DCI (e.g., DCI format 0_1 with CRC bits scrambled by a configured-scheduling radio network temporary identifier (CS-RNTI)) and, if a DFI flag in the DCI is set to a one value (e.g., if the DFI flag is 1), the DFI is present in the DCI and conveyed via a 16-bit bitmap indicating HARQ-ACK for each HARQ ID for the previous set of one or more PUSCH transmissions. In other words, each respective bit in the 16-bit bitmap may indicate either an ACK or a NACK for a respective HARQ ID, where a mapping rule may define the correspondence between a bit in the bitmap and a corresponding HARQ ID. If the DFI flag is set to a zero value (e.g., if the DFI flag is 0), the DCI may not include the DFI 215. In such cases in which the DFI flag is set to a zero value, the DCI may be an uplink-associated DCI that can, for example, activate a CG-PUSCH. As such, the DCI format 0_1 including the DFI 215 may have a CRC scrambled with CS-RNTI and exclusively in this case can the DFI 215 be indicated and a DFI flag be set to 1.

As an example, the network entity 105-a may set the DFI flag to a 1 bit if the UE 115-a is configured to monitor DCI format 0_1 with CRC scrambled by CS-RNTI and for operation in a cell with shared spectrum channel access. For a DCI format 0_1 with CRC scrambled by CS-RNTI, the bit value of 0 may indicate activating type 2 CG transmission and the bit value of 1 may indicate CG-DFI. For a DCI format 0_1 with CRC scrambled by C-RNTI, semi-persistent channel state information radio network temporary identifier (SP-CSI-RNTI), or modulation and coding scheme cell radio network temporary identifier (MCS-C-RNTI) and for operation in a cell with shared spectrum channel access, the bit (e.g., the bit otherwise used for the DFI flag) is reserved. The DFI flag bit may be set to a zero value otherwise.

Further, if a DCI format 0_1 is used for indicating CG-DFI (such that DFI 215 is present in the DCI), the remaining fields of the DCI may be set to include a HARQ-ACK bitmap and a transmit power control (TPC) command field, and all the remaining bits in DCI format 0_1 may be set to zero. The HARQ-ACK bitmap may include 16 bits and an order of the bitmap to HARQ process index mapping is such that HARQ process indices may be mapped in ascending order from most significant bit (MSB) to least significant bit (LSB) of the bitmap. For each bit of the bitmap, a value of 1 may indicate an ACK and a value of 0 may indicate a NACK. The TPC command field may be for a scheduled PUSCH and may include two bits.

Further, in some aspects, the UE 115-a may use one or more CG resources for one or more retransmissions. In such aspects in which the UE 115-a uses a CG resource for a retransmission, the UE 115-a may autonomously decide or select a HARQ ID, an NDI value (where if the NDI is toggled, it indicates a new transmission; otherwise, it indicates a retransmission), and an RV for each CG occasion. In accordance with such an autonomous selection by the UE 115-a, the UE 115-a may include an indication of the selected HARQ ID, NDI, and RV, as well as channel occupancy time (COT) sharing information (which may be related to unlicensed operation, such as New Radio Unlicensed (NRU) operation), in UCI 220 and may multiplex the UCI 220 on each CG-PUSCH. The UE 115-a may separately encode UCI 220, which may be referred to as CG-UCI, for separate or different CG-PUSCH transmissions and may multiplex the UCI 220 on a CG-PUSCH to which the information in the UCI 220 corresponds. As such, the network entity 105-a may use UCI 220 including a HARQ ID, an NDI, an RV, and COT sharing information for decoding an associated CG-PUSCH. In other words, the network entity 105-a may decode the UCI 220 and may subsequently decode uplink data on the CG-PUSCH to which the UCI 220 corresponds (e.g., for which the UCI 220 provides information).

A mapping order of UCI 220 (e.g., CG-UCI) fields in illustrated by Table 1, shown below. As shown in Table 1, the UCI 220 may include a HARQ process number (or HARQ process ID) field having a bitwidth of 4, an RV field having a bitwidth of 2, an NDI field having a bitwidth of 1, and a COT sharing information field having a variable bitwidth. For example, the COT sharing information field may include a quantity of bits based on a $\lceil \log_2 C \rceil$ value if both higher layer parameter ul-toDL-COT-SharingED-Threshold and higher layer parameter cg-COT-SharingList are configured, where C may be the number of combinations configured in cg-COT-SharingList. In another example, the COT sharing information field may have a bitwidth of 1 if higher layer parameter ul-toDL-COT-SharingED-Threshold is not configured and higher layer parameter cg-COT-SharingOffset is configured. In another example, the COT sharing information field may have a bitwidth of 0 otherwise. Further, if the UE 115-a indicates COT sharing other than "no sharing" in a CG-PUSCH within an initiated COT of the UE 115-a, the UE 115-a may be configured to provide consistent COT sharing information in a set of (e.g., all) the subsequent CG-PUSCHs, if any, occurring within the same initiated COT of the UE 115-a such that the same downlink starting point and duration may be maintained.

TABLE 1

Mapping Order of CG-UCI Fields

| Field | Bitwidth |
| --- | --- |
| HARQ Process Number | 4 |
| Redundancy Version (RV) | 2 |
| New Data Indicator (NDI) | 1 |
| COT Sharing Information | Variable |

In some aspects, the UE 115-*a* and the network entity 105-*a* may support multiple (e.g., two) codewords and multiple (e.g., two) TBs for a PUSCH transmission. For example, the UE 115-*a* and the network entity 105-*a* may introduce or otherwise support multiple codewords and TBs as part of a more than four layer (with eight transmission ports) transmission or as part of a simultaneous multi-panel transmission, or both. As such, the UE 115-*a* and the network entity 105-*a* may support one or more uplink demodulation reference signal (DMRS), sounding reference signal (SRS), SRS resource indicator (SRI), or transmit precoding matrix indicator (TPMI) (including codebook) enhancements to enable eight transmission port uplink operation to support four and more layers per UE in uplink (e.g., for customer premises equipment (CPE), fixed wireless access (FWA), vehicle, or industrial devices). The UE 115-*a* and the network entity 105-*a* may support updates, rules, or constraints associated with coherence assumption or full/non-full power modes as part of such DMRS, SRS, SRI, or TPMI enhancements. Further, the UE 115-*a* and the network entity 105-*a* may facilitate simultaneous multi-panel uplink transmission for higher uplink throughput or reliability (e.g., for FR2 or multi-TRP operation, assuming up to two TRPs and up to two panels, and, for example, for CPE, FWA, vehicle, or industrial devices, if applicable) in accordance with an uplink precoding indication for PUSCH without introducing a new codebook for multi-panel simultaneous transmission. In such aspects, a total number of layers may be up to four across a set of (e.g., all) panels and a total number of codewords may be up to two across a set of (e.g., all) panels, considering single DCI or multi-DCI based multi-TRP operation.

As such, multi-codeword or multi-TB PUSCH transmissions may include two (or potentially more) TBs. Further, the UE 115-*a* and the network entity 105-*a* may define various use cases associated with PUSCH transmissions including or using multiple TBs. For example, the UE 115-*a* and the network entity 105-*a* may define a first use case in which a PUSCH with two or more TBs is supported for DG-PUSCH and is not supported for CG-PUSCH. Additionally, or alternatively, the UE 115-*a* and the network entity 105-*a* may define a second use case in which a PUSCH with two or more TBs is supported for both DG-PUSCH and CG-PUSCH. As such, in the context of the wireless communications system 200, the UE 115-*a* may transmit the data message 210 using or including a first codeword (e.g., CW0) and a corresponding first TB (e.g., TB0) and using or including a second codeword (e.g., CW1) and a corresponding second TB (e.g., TB1) as part of a DG-PUSCH transmission in accordance with the first use case or as part of a DG-PUSCH or CG-PUSCH transmission in accordance with the second use case.

In some systems, however, the UE 115-*a* and the network entity 105-*a* may lack a mutually understood rule for interpreting or formatting DFI 215 or UCI 220 to support PUSCH transmissions that use or include multiple codewords and TBs. For example, in some systems, DFI 215 may include enough bits for indicating feedback for one codeword or one TB per PUSCH transmission and, similarly, UCI 220 may include enough bits for indicating feedback-related information for a single codeword and TB of a corresponding CG-PUSCH, but no more. Further, while the UE 115-*a* may not use UCI 220 for the data message 210 in the first use case (as the UE 115-*a* may avoid using multiple TBs for CG-PUSCH transmissions), updates to DFI 215 may improve communication between the UE 115-*a* and the network entity 105-*a* as the network entity 105-*a* may still provide feedback associated with a multi-TB DG-PUSCH via DFI 215. For example, the DFI 215 may include a HARQ-ACK bitmap of 16 bits in some systems, which may be insufficient if at least some of the HARQ IDs corresponding to a previous set of one or more DG-PUSCH transmissions are scheduled with two or more TBs (as each TB or codeword may be associated with a different decoding operation, and therefore different feedback).

In some implementations, the UE 115-*a* and the network entity 105-*a* may support signaling designs and a feedback mechanism associated with a data message 210 transmitted by the UE 115-*a* including or using two or more TBs. For example, if the UE 115-*a* is configured (e.g., RRC-configured) with a multiple codewords or TBs for the data message 210 (e.g., RRC configured with a maximum number of codewords or TBs for PUSCH=2, at least for PUSCH scheduled by DCI, such as DG-PUSCH), if for a given HARQ process ID, the PUSCH includes multiple TBs and a DFI flag is set to 1 in a DCI format 0_1 (such that the HARQ-ACK bitmap field is indicated by the DCI), the UE 115-*a* and the network entity 105-*a* may operate in accordance with a mutually understood rule or support a multi-TB accommodating DFI format to maintain synchronization between the UE 115-*a* and the network entity 105-*a*. In some aspects, for example, the DFI 215 may include a single bit corresponding to the HARQ process ID associated with the data message 210 and the UE 115-*a* and the network entity 105-*a* may operate in accordance with a mutually understood rule to interpret feedback indicated by the single bit. In some other aspects, the DFI 215 may include multiple bits corresponding to the HARQ process ID associated with the data message 210 such that a respective bit of the multiple bits indicates respective feedback for a respective TB of the multiple TBs used or included in the data message 210.

In some aspects in which there is a single bit corresponding to the HARQ process ID associated with the data message 210, the UE 115-*a* and the network entity 105-*a* may determine or expect that the single bit exclusively corresponds to a first TB (e.g., the TB0 and the CW0) of the data message (e.g., the PUSCH). In such aspects, the network entity 105-*a* may refrain from indicating HARQ-ACK information for other TBs (e.g., the TB1 and the CW1) of the data message via the DFI 215 (or the DCI carrying the DFI 215) and a bitmap size of the DFI 215 may be 16 bits. In some other aspects in which there is a single bit corresponding to the HARQ process ID associated with the data message 210, the UE 115-*a* and the network entity 105-*a* may determine or expect that the single bit corresponds to a logical operation between the feedbacks associated with the different TBs of the data message 210. For example, the UE 115-*a* and the network entity 105-*a* may determine or expect the single bit to correspond to a logical AND operation or a logical OR operation between first HARQ-ACK feedback for the first TB (e.g., the TB0 and the CW0) and second HARQ-ACK feedback for the second TB (e.g., the TB1 and the CW1).

In such aspects in which a logical AND operation is used, the network entity 105-*a* may set the single bit that corresponds to the HARQ process ID associated with the data message 210 to a 1 value to indicate an ACK for both the first TB and the second TB or to a 0 value to indicate a NACK for at least one of the first TB and the second TB. In such aspects in which a logical OR operation is used, the network entity 105-*a* may set the single bit to a 1 value to indicate an ACK for at least one of the first TB and the second TB or to a 0 value to indicate a NACK for both the first TB and the second TB. As such, the network entity 105-*a* may effectively bundle two (or more) HARQ-ACKs together to indicate feedback for data messages 210 associated with multiple TBs and a bitmap size of the DFI 215 may be 16 bits.

In aspects in which there are multiple bits (e.g., two bits) corresponding to the HARQ process ID associated with the data message 210 (and therefore associated with the first TB and the second TB of the PUSCH), the bitmap size of the DFI 215 may increase and the DFI 215 may include a respective bit for each TB associated with the data message 210. For example, the DFI 215 may include a first bit that indicates first HARQ-ACK feedback for the first TB (e.g., the TB0 and the CW0) and a second bit that indicates second HARQ-ACK feedback for the second TB (e.g., the TB1 and the CW1). In such examples in which the data message 210 uses or includes two TBs (or in which a maximum of two TBs for a PUSCH transmission is supported), the bitmap size of the DFI 215 may be 32 bits.

In some aspects, the DFI 215 may be extended to include multiple bits for each of several PUSCH transmissions and, in some scenarios, fewer than all of the several PUSCH transmissions may use multiple TBs. For example, if one TB is included for a different PUSCH corresponding to a different HARQ process ID, a second bit in the DFI 215 corresponding to that different HARQ process ID may be ignored or may be set to a fixed or default value (e.g., set to a 0 value, such as to indicate a NACK). In other words, the UE 115-*a* may be configured to ignore any extra bits in the DFI 215 for any PUSCH transmissions that are sent including one TB in scenarios in which the bitmap size of the DFI 215 is extended to support multiple TBs for several PUSCH transmissions.

Further, in some aspects, the UE 115-*a* and the network entity 105-*a* may maintain a fixed size for DCI format 0_1 (e.g., the DCI format associated with carrying the DFI 215) irrespective of whether the DCI has a CRC scrambled with CS-RNTI (which may be indicative of a potential inclusion of the DFI 215) or has a CRC scrambled with a cell radio network temporary identifier (C-RNTI). For example, in aspects in which the DFI 215 is extended to include 32 bits, a quantity of bits (e.g., information-conveying bits) in DCI with CRC scrambled with CS-RNTI and DFI flag set to 1 may be greater than a quantity of bits (e.g., information-conveying bits) in DCI with CRC scrambled with C-RNTI or DFI is not set to 1. In other words, some designs for a DCI format 0_1 that is more generally used for scheduling or activating a PUSCH may sometimes not have enough bits to accommodate the 32 bits in the DFI 215.

As such, in some implementations, the UE 115-*a* and the network entity 105-*a* may set or expect a size of the DCI format 0_1 based on a maximum number of bits between scheduling DCI (e.g., DCI format 0_1 scrambled by C-RNTI) and the DCI indicating the DFI 215 (e.g., DCI format 0_1 scrambled by CS-RNTI). In such implementations, the UE 115-*a* and the network entity 105-*a* may zero-pad the DCI with the smaller number of bits until a size of the scheduling DCI and the size of the DCI indicating the DFI 215 become the same. For example, if the DCI indicating the DFI 215 includes 10 more information-conveying bits than the scheduling DCI, the UE 115-*a* and the network entity 105-*a* may add 10 zero bits (or expect 10 zero bits to be added) to the scheduling DCI such that DCIs associated with the DCI format 0_1 are consistently the same. In some other implementations, the UE 115-*a* and the network entity 105-*a* may expect that an extension of the size of the DFI 215 exclusively occurs (e.g., is only supported if) the scheduling DCI (e.g., DCI format 0_1 scrambled by C-RNTI) and the DCI indicating the DFI 215 (e.g., DCI format 0_1 scrambled by CS-RNTI) are the same size or if the scheduling DCI otherwise has enough bits to accommodate the extended DFI 215 (e.g., the 32-bit DFI 215) in addition to other fields associated with the DFI 215 (e.g., a DCI identifier field, a carrier indicator field (CIF), and a TPC field).

In some aspects, the UE 115-*a* and the network entity 105-*a* may support one or more options associated with whether the DFI 215 includes a single bit or includes multiple bits to indicate feedback for the data message 210 and a selection or choice between the one or more options may be configurable by the network entity 105-*a* (e.g., by the network), such as via RRC signaling. In some aspects, the network entity 105-*a* may configure multiple options associated with whether the DFI 215 includes a single bit or multiple bits at the UE 115-*a* and the UE 115-*a* and the network entity 105-*a* may use additional signaling or a mutually understood rule to select one of the multiple options. Additionally, or alternatively, the network entity 105-*a* may configure one or multiple options at the UE 115-*a* and may transmit an implicit indication of one option via additional signaling. For example, if the UE 115-*a* is configured with a first option associated with interpreting a single bit in the DFI 215 as exclusively indicating feedback for one TB of the multiple TBs, a second option associated with interpreting a single bit in the DFI 215 as indicating bundled feedback for the first TB and the second TB, and a third option associated with supporting multiple (e.g., two) bits corresponding to the multi-TB data message 210 in the DFI 215, the UE 115-*a* and the network entity 105-*a* may select the second option if a bundling of HARQ-ACK feedback for two uplink TBs of a PUSCH is RRC configured; otherwise, the UE 115-*a* and the network entity 105-*a* may select the first option or the third option. For further example, the UE 115-*a* and the network entity 105-*a* may select the third option if the UE 115-*a* is RRC configured with 32 bits for a size of the HARQ-ACK bitmap field; otherwise, the UE 115-*a* and the network entity 105-*a* may select the first option or the second option.

Further, in some aspects, a selection between various options configured or available at the UE 115-*a* and the network entity 105-*a* may be conditioned based on a cg-Retransmission Timer parameter to be RRC configured. For example, indicating DFI 215 in DCI format 0_1 may be conditioned on the cg-Retransmission Timer parameter to be configured. In other words, a transmission behavior, format, or content of the DFI 215 (or the UCI 220, or both) may depend on whether or not the cg-Retransmission Timer parameter is configured. For example, the UE 115-*a* and the network entity 105-*a* may support a first set of one or more options for DFI 215 if the cg-Retransmission Timer parameter is configured and may support a second set of one or more options for DFI 215 if the cg-Retransmission Timer parameter is not configured. For instance, if the cg-RetransmissionTimer parameter is not configured, the UE 115-*a* and the network entity 105-*a* may exclusively support the first option for the DFI 215.

Additionally, or alternatively, the UE 115-*a* and the network entity 105-*a* may multiplex UCI 220 (e.g., CG-UCI) with the data message 210 and may support a UCI design associated with CG-PUSCH transmissions that provides sufficient information for CG-PUSCH transmissions that use or include multiple TBs. For example, the UE 115-*a* and the network entity 105-*a* may support a UCI format according to which the UE 115-*a* is able to indicate multiple NDI fields and multiple RV fields via the UCI 220 associated with the data message 210. As such, a respective NDI field and a respective RV field may indicate feedback-related information for a respective TB of the multiple TBs used or included in the data message 210. The UE 115-*a* and the network entity 105-*a* may support such a UCI format in the second use case in which a CG-PUSCH is available for multi-TB transmissions and in addition to supporting the DFI 215 (e.g., the DFI 215 that is associated with multiple TBs). In some aspects, the UE 115-*a* and the network entity 105-*a* may select the second option (in which the DFI 215 indicates bundled feedback for multiple TBs) or the third option (in which the DFI 215 includes multiple bits for a given HARQ process ID) relatively more frequently in the second use case in which the UE 115-*a* and the network entity 105-*a* also support the UCI format that is associated with multiple TBs. Additional details relating to the UCI 220 are illustrated by and described with reference to FIGS. 3 and 4.

Figure 3:
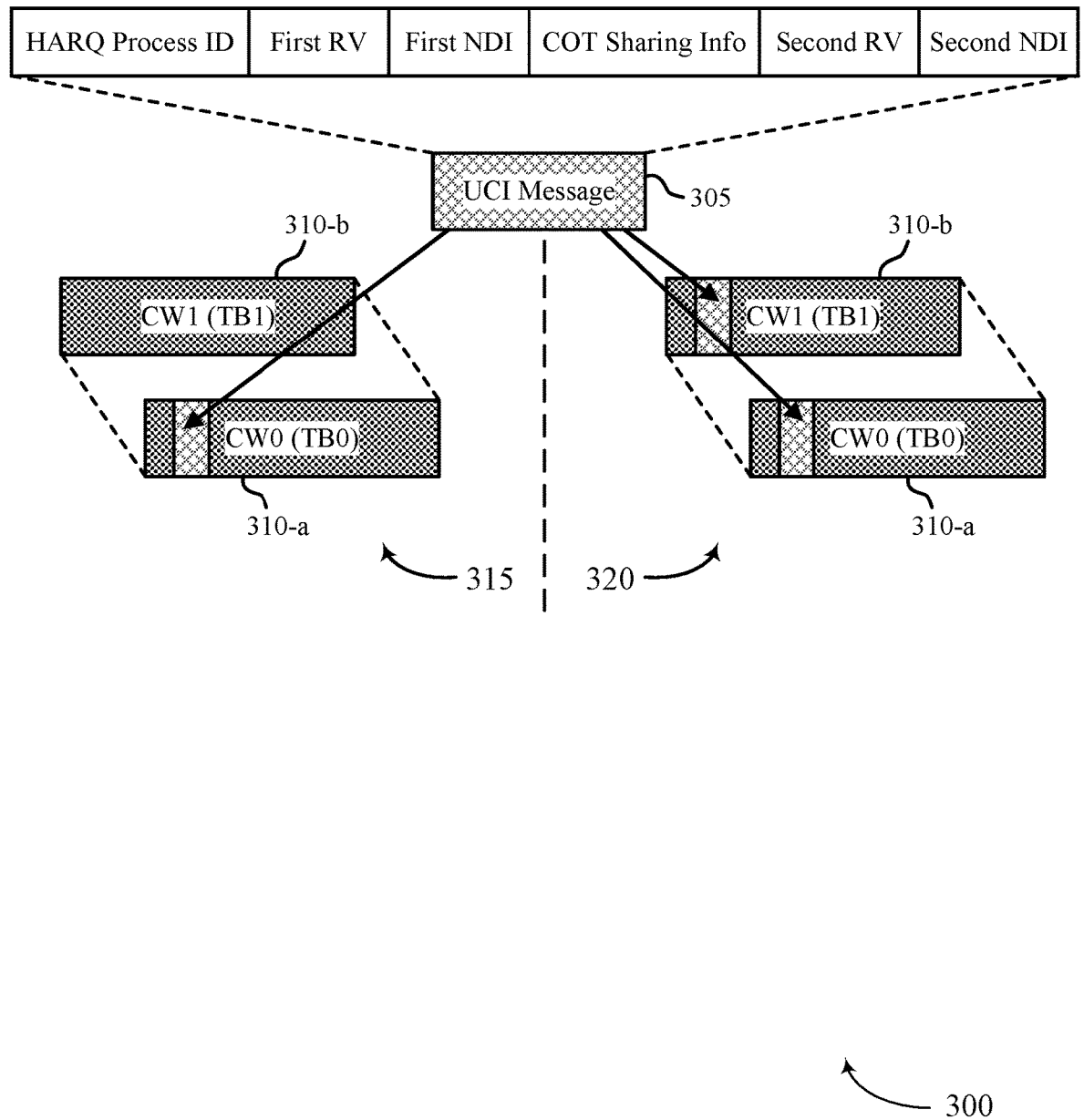
FIGS. 3 and 4 show examples of uplink control information (UCI) signaling designs that support multi-TB uplink shared channel transmission feedback mechanisms in accordance with one or more aspects of the present disclosure.

FIG. 3 shows an example of a UCI signaling design 300 that supports multi-TB uplink shared channel transmission feedback mechanisms in accordance with one or more aspects of the present disclosure. The UCI signaling design 300 may implement or be implemented to realize aspects of the wireless communications system 100 or the wireless communications system 200. For example, a UE 115 and a network entity 105, which may be examples of corresponding devices as illustrated by and described with reference to FIGS. 1 and 2, may support the UCI signaling design 300 to construct and transmit a single UCI message 305 (e.g., a CG-UCI message) with a data message (such as a data message 210) associated with multiple TBs 310. For example, the UE 115 may be scheduled or activated to transmit a data message 210 using a first TB 310-*a* (e.g., a TB0 associated with a CW0) and a second TB 310-*b* (e.g., a TB1 associated with a CW1) and, in scenarios in which the data message 210 is a CG-PUSCH transmission, the UE 115 may multiplex the single UCI message 305 with the data message 210 and may provide feedback-related information associated with the multiple TBs 310 via the single UCI message 305.

In some implementations, for example, the UE 115 and the network entity 105 may support a UCI format such that the single UCI message 305 that is multiplexed on the CG-PUSCH indicates multiple (e.g., two) NDI fields and multiple (e.g., two) RV fields corresponding to the multiple (e.g., two) TBs 310. In some aspects, the UE 115 may jointly encode UCI to obtain the single UCI message 305 and may multiplex the single UCI message 305 on the PUSCH. For example, and as illustrated by the UCI signaling design 300, the single UCI message 305 may include two RV fields including a first RV field and a second RV field (e.g., 4 bits total), two NDI fields including a first NDI field and a second NDI field (e.g., 2 bits total), one HARQ process ID field, and one COT sharing information field.

In some aspects, and as illustrated by an option 315, the UE 115 may multiplex the jointly encoded UCI (e.g., the single UCI message 305) on one or more layers of one of the TBs 310. For example, the UE 115 may multiplex the UCI message 305 on one or more layers associated with the first TB 310-*a*. The first TB 310-*a* may be a first TB, a TB associated with a relatively larger MCS, or a TB corresponding to a relatively larger TB size (TBS), among other examples. In some other aspects, and as illustrated by an option 320, the UE 115 may multiplex the jointly encoded UCI (e.g., the single UCI message 305) on one or more layers associated with multiple TBs. For example, the UE 115 may multiplex the single UCI message 305 on a first set of one or more layers associated with the first TB 310-*a* and on a second set of one or more layers associated with the second TB 310-*b*. As such, the UE 115 may multiplex the jointly encoded UCI on the layers of both TBs 310.

The network entity 105 may demultiplex and decode the UCI in a similar manner to how the UE 115 encodes and multiplexes the UCI. For example, if the UE 115 jointly encodes the UCI such that the single UCI message 305 includes the first RV field, the first NDI field, the second RV field, and the second NDI field and multiplexes the single UCI message 305 on one or more layers associated with the first TB 310-*a* (e.g., if the UE 115 follows option 315), the network entity 105 may demultiplex the single UCI message 305 from the one or more layers associated with the first TB 310-*a* and attempt to decode the demultiplexed single UCI message 305. The network entity 105 may alternatively demultiplex the single UCI message 305 from one or more layers of both the first TB 310-*a* and the second TB 310-*b* and attempt to decode the demultiplexed single UCI message 305 if the UE 115 multiplexes the single message on both the first TB 310-*a* and the second TB 310-*b* (e.g., if the UE 115 follows option 320).

Figure 4:
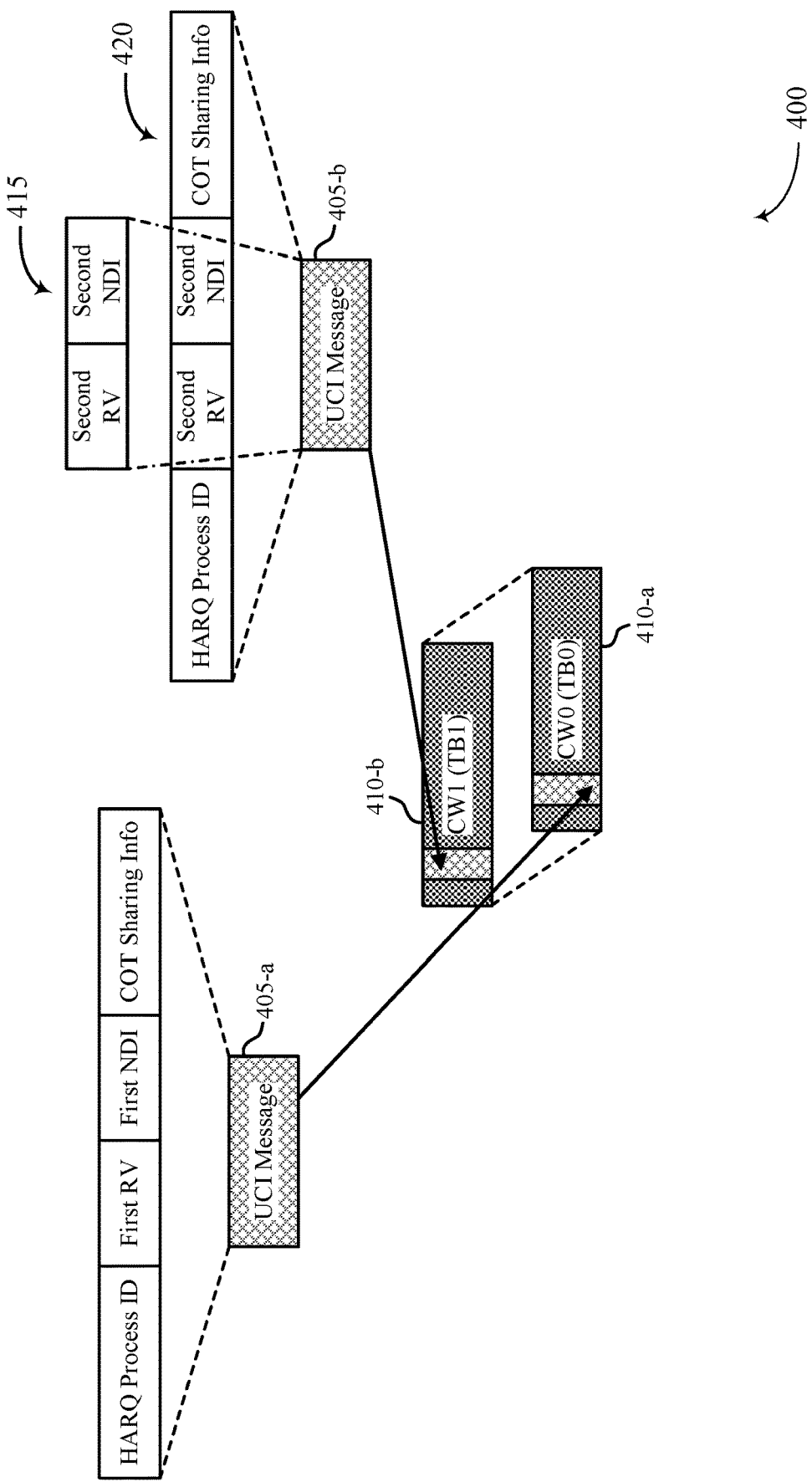

FIG. 4 shows an example of a UCI signaling design 400 that supports multi-TB uplink shared channel transmission feedback mechanisms in accordance with one or more aspects of the present disclosure. The UCI signaling design 400 may implement or be implemented to realize aspects of the wireless communications system 100 or the wireless communications system 200. For example, a UE 115 and a network entity 105, which may be examples of corresponding devices as illustrated by and described with reference to FIGS. 1 and 2, may support the UCI signaling design 400 to construct and transmit multiple UCI messages 405 (e.g., multiple CG-UCI messages) with a data message (such as a data message 210) associated with multiple TBs 410. For example, the UE 115 may be scheduled or activated to transmit a data message 210 using a first TB 410-*a* (e.g., a TB0 associated with a CW0) and a second TB 410-*b* (e.g., a TB1 associated with a CW1) and, in scenarios in which the data message 210 is a CG-PUSCH transmission, the UE 115 may multiplex the multiple UCI messages 405 with the data message 210 and may provide feedback-related information associated with the multiple TBs 310 via the multiple UCI messages 405.

In some implementations, for example, the UE 115 may encode the UCI (e.g., the CG-UCI) corresponding to each TB 410 separately to obtain the multiple UCI messages 405 and may multiplex a respective UCI message 405 of the multiple UCI messages 405 on a corresponding TB 410. For example, the UE 115 may encode the UCI to obtain a UCI message 405-*a* that indicates feedback-related information for the first TB 410-*a* and a UCI message 405-*b* that indicates feedback-related information for the second TB 410-*b*. Accordingly, the UE 115 may multiplex the UCI message 405-*a* on a first set of one or more layers associated with the first TB 410-*a* and may multiplex the UCI message 405-*b* on a second set of one or more layers associated with the second TB 410-*b*. For one of the TBs 410 (e.g., the first TB 410-*a*), the corresponding UCI message 405 (e.g., the UCI message 405-*a*) may include a first RV field, a first NDI field, one HARQ process ID field, and one COT sharing information field. For a remaining number of TBs 410 (e.g., for the other TB 410, such as the second TB 410-*b*), the corresponding one or more UCI messages 405 (e.g., the UCI message 405-*b*) may either include a second RV field, a second NDI field, one HARQ process ID field, and one COT sharing information field or include the second RV field and the second NDI field and exclude a HARQ process ID field and a COT sharing information field.

For example, in an option 415, the UE 115 may include the second RV field and the second NDI field and exclude a HARQ process ID field and a COT sharing information field. In such an option 415, the UE 115 and the network entity 105 may achieve lower signaling overhead and greater spectral efficiency, as the UCI message 405-*b* may include fewer (and less redundant) fields. In an option 420, the UE 115 may additionally include a HARQ process ID field and a COT sharing information field in the UCI message 405-*b* (along with the second RV field and the second NDI field) and the HARQ process ID field and the COT sharing information field of both the UCI message 405-*a* and the UCI message 405-*b* may include same content or information. In such an option 420, the UE 115 and the network entity 105 may achieve greater reliability, as even if the network entity 105 fails to decode the UCI message 405-*a* but successfully decodes the UCI message 405-*b*, the network entity 105 may still try to decode the second TB 410-*b* using the information in the successfully decoded UCI message 405-*b*.

The network entity 105 may demultiplex and decode the UCI in a similar manner to how the UE 115 encodes and multiplexes the UCI. For example, the network entity may demultiplex the UCI message 405-*a* from the first TB 410-*a* and may demultiplex the UCI message 405-*b* from the second TB 410-*b* and may separately decode the demultiplexed UCI message 405-*a* and the demultiplexed UCI message 405-*b*.

Figure 5:
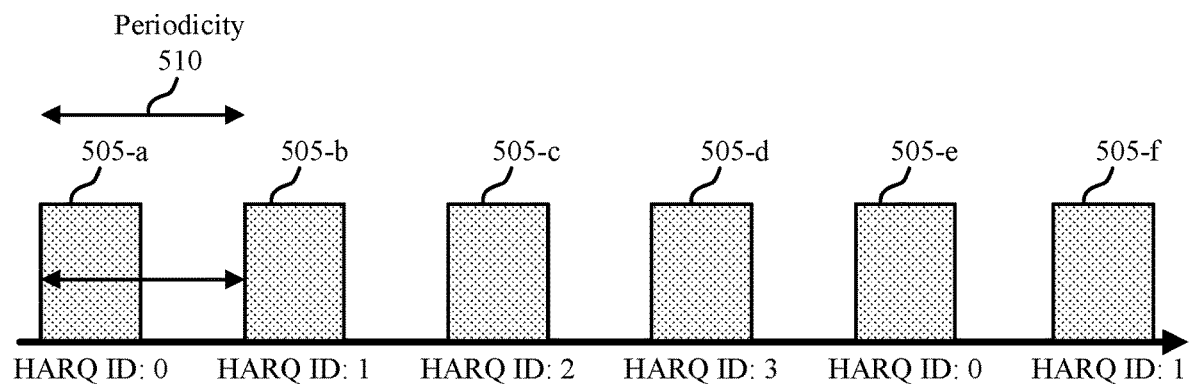
FIG. 5 shows an example of a communication timeline that supports multi-TB uplink shared channel transmission feedback mechanisms in accordance with one or more aspects of the present disclosure.

FIG. 5 shows an example of a communication timeline 500 that supports multi-TB uplink shared channel transmission feedback mechanisms in accordance with one or more aspects of the present disclosure. The communication timeline 500 may implement or be implemented to realize aspects of the wireless communications system 100, the wireless communications system 200, the UCI signaling design 300, or the UCI signaling design 400. For example, a UE 115 and a network entity 105, which may be examples of corresponding devices as illustrated by and described with reference to FIGS. 1 and 2, may communicate in accordance with the communication timeline 500 in accordance with a CG configuration for various CG occasions 505. In some implementations, the UE 115 and the network entity 105 may support feedback-related signaling designs that support a feedback mechanism for CG-PUSCH or DG-PUSCH transmissions that use or include multiple TBs.

A CG configuration may be associated with a Type 1 CG or a Type 2 CG. In a Type 1 CG, the network entity 105 may configure (e.g., RRC configure) all relevant parameters and scheduling information. In a Type 2 CG, the network entity 105 may configure (e.g., RRC configure) a first portion of parameters or information and may indicate a second portion of parameters or information in DCI that activates the CG-PUSCH. Such a first portion of parameters or information may include a periodicity 510 and an offset. In some aspects, a DCI activates a CG and the UE 115 may transmit PUSCH according to a periodicity 510 and offset until another DCI releases the CG. In other words, the periodicity 510 and offset, among other parameters, may indicate or otherwise enable the UE 115 to identify various CG occasions 505 during which the UE 115 may perform a CG-PUSCH transmission. For example, in accordance with the periodicity 510 and the offset, the UE 115 may identify a CG occasion 505-*a*, a CG occasion 505-*b*, a CG occasion 505-*c*, a CG occasion 505-*d*, a CG occasion 505-*e*, and a CG occasion 505-*f*.

For both activation and release DCI, a CRC of the DCI may be scrambled with CS-RNTI. For validation of the activation or release indicated by the DCI, the DCI may include an NDI field=0, an RV field=0, and a HARQ ID field=0. Further, for both Type 1 CG and Type 2 CG, an RV may be equal to 0 in each CG occasion 505 and the UE 115 and the network entity 105 may calculate, compute, or otherwise determine a HARQ ID (for each CG occasion 505) from timing with a modulo operation to nrofHARQ-Processes configured for the CG occasion 505. For example, the UE 115 and the network entity 105 may calculate, compute, or otherwise determine a HARQ process ID in accordance with Equation 1, shown below.

$$\text{HARQ ProcessID} = [\text{floor}(\text{CURRENT\_symbol}/\text{periodicity})] \text{ modulo nrofHARQProcesses} \quad (1)$$

As shown in Equation 1, CURRENT_symbol=(SFN× numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively. In some aspects, CURRENT_symbol may refer to a symbol index of a first or initial transmission occasion of a repetition bundle that takes place. As shown in the communication timeline 500, the CG occasion 505-*a* and the CG occasion 505-*e* may be associated with HARQ IDs=0, the CG occasion 505-*b* and the CG occasion 505-*f* may be associated with HARQ IDs=1, the CG occasion 505-*c* may be associated with a HARQ ID=2, and the CG occasion 505-*d* may be associated with a HARQ ID=3.

Figure 6:
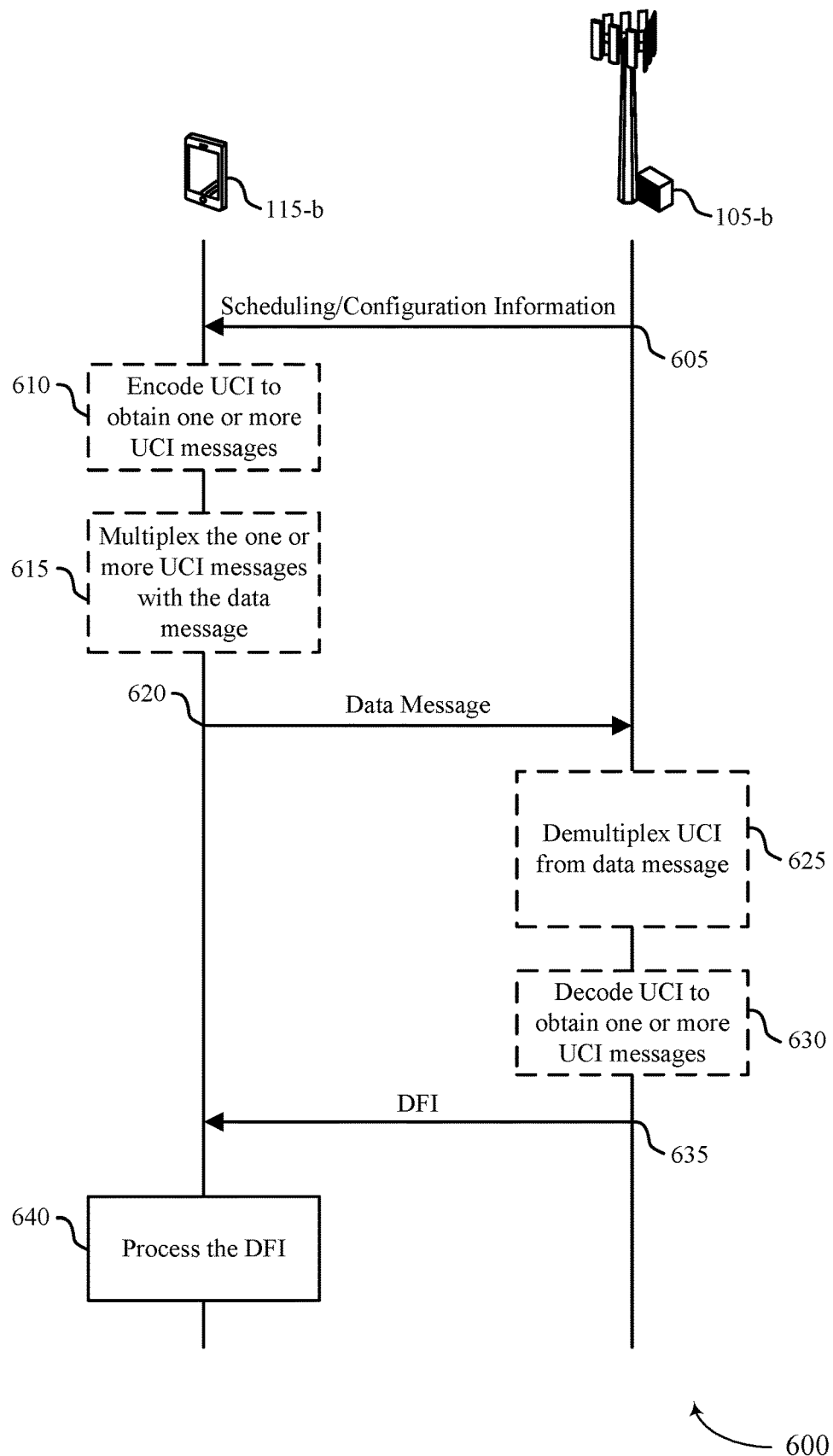
FIG. 6 shows an example of a process flow that supports multi-TB uplink shared channel transmission feedback mechanisms in accordance with one or more aspects of the present disclosure.

FIG. 6 shows an example of a process flow 600 that supports multi-TB uplink shared channel transmission feedback mechanisms in accordance with one or more aspects of the present disclosure. The process flow 600 may implement or be implemented by aspects of the wireless communications system 100, the wireless communications system 200, the UCI signaling design 300, the UCI signaling design 400, or the communication timeline 500. For example, the process flow 600 illustrates communication between a UE 115-*b* and a network entity 105-*b*, which may be examples of corresponding devices as illustrated by and described with reference to FIGS. 1 and 2. In some implementations, the UE 115-*b* and the network entity 105-*b* may support feedback-related signaling designs that support a feedback mechanism for CG-PUSCH or DG-PUSCH transmissions that use or include multiple TBs.

In the following description of the process flow 600, the operations may be performed (e.g., reported or provided) in a different order than the order shown, or the operations performed by the example devices may be performed in different orders or at different times. For example, specific operations may also be left out of the process flow 600, or other operations may be added to the process flow 600. Further, although some operations or signaling may be shown to occur at different times for discussion purposes, these operations may actually occur at the same time.

At 605, the UE 115-*b* may receive, from the network entity 105-*b*, scheduling or configuration information that indicates the UE 115-*b* is to transmit a data message using multiple TBs, the multiple TBs including at least a first TB and a second TB. Additionally, or alternatively, the UE 115-*b* may receive configuration information associated with DFI that the network entity 105-*b* may provide to the UE 115-*a* responsive to the data message, and the UE 115-*b* may expect to process the DFI based on the configuration information. In some aspects, such configuration information for the DFI may indicate an option for formatting or interpreting the DFI based on the data message using multiple TBs, as described in more detail with reference to FIG. 2. For example, the configuration information may indicate how the UE 115-*b* is to interpret one or more bits in DFI as HARQ-ACK feedback for one or both of the first TB and the second TB or whether the UE 115-*b* is to ignore any bits in DFI, among other examples. In some aspects, the UE 115-*b* may receive the scheduling or configuration information from the network entity 105-*b* via one or more of RRC signaling, DCI, or a MAC control element (MAC-CE).

At 610, in some implementations, the UE 115-*b* may encode UCI to obtain one or more UCI messages associated with the data message. For example, in implementations in which the UE 115-*b* transmits the data message via a CG-PUSCH, the UE 115-*b* may multiplex UCI with the data message and the UCI may include multiple NDI fields and multiple RV fields, where a respective NDI field of the multiple NDI fields and a respective RV field of the multiple RV fields correspond to a respective TB of the multiple TBs.

In some aspects, the UE 115-*b* may encode the UCI to obtain a single UCI message including the multiple NDI fields and the multiple RV fields. Additional details relating to such a joint encoding to obtain a single UCI message with multiple NDI fields and multiple RV fields are illustrated by and described with reference to FIG. 3. In some other aspects, the UE 115-*b* may encode the UCI to obtain multiple UCI messages. The multiple UCI messages may include a first UCI message and a second UCI message, where the first UCI message includes a first NDI field and a first RV field corresponding to the first TB and the second UCI message includes a second NDI field and a second RV field corresponding to the second TB.

At 615, in some implementations, the UE 115-*b* may multiplex the one or more UCI messages with the data message. For example, in implementations in which the UE 115-*b* transmits UCI with the data message via a CG-PUSCH, the UE 115-*b* may multiplex the UCI with the data message on the CG-PUSCH. In aspects in which the UE 115-*b* jointly encodes the UCI to obtain a single UCI message, the UE 115-*b* may multiplex the single UCI message on one or more layers associated with one of the first TB or the second TB or may multiplex the single UCI message on both a first set of one or more layers associated with the first TB and a second set of one or more layers associated with the second TB. In aspects in which the UE 115-*b* encodes the UCI to obtain multiple the UCI messages including the first UCI message and the second UCI message, the UE 115-*b* may multiplex the first UCI message on a first set of one or more layers associated with the first TB and may multiplex the second UCI message on a second set of one or more layers associated with the second TB.

At 620, the UE 115-*b* may transmit, to the network entity 105-*b* based on the scheduling or configuration information, the data message using or including the multiple TBs. The data message may include or may otherwise be associated with a feedback process ID (e.g., a HARQ process ID) that is associated with the multiple TBs of the data message. For example, the data message may indicate a feedback process ID via UCI (e.g., for CG-PUSCH) or the data message may be associated with a feedback process ID indicated in a scheduling or activating DCI (e.g., for DG-PUSCH).

At 625, in some implementations, the network entity 105-*b* may demultiplex the UCI from the data message. In accordance with whether the UE 115-*b* encodes the UCI to obtain a single UCI message or multiple UCI messages, the network entity 105-*b* may either demultiplex a single UCI message from one or both of a first set of layers associated with the first TB and a second set of layers associated with the second TB or demultiplex a different UCI message from each of the first set of layers associated with the first TB and the second set of layers associated with the second TB. In some aspects, the receiving of the data message by the network entity 105-*b* is associated with the demultiplexing of the UCI from the data message.

At 630, in some implementations, the network entity 105-*b* may decode the UCI to obtain the one or more UCI messages. In some aspects, the network entity 105-*b* may decode the UCI demultiplexed from the data message to obtain a single UCI message that includes multiple NDI fields and multiple RV fields. In some other aspects, the network entity 105-*b* may decode the UCI demultiplexed from the data message to obtain multiple UCI messages. The multiple UCI messages may include a first UCI message and a second UCI message, and the first UCI message may include a first NDI field and a first RV field corresponding to the first TB of the data message and the second UCI message may include a second NDI field and a second RV field corresponding to the second TB of the data message.

At 635, the UE 115-*b* may receive, from the network entity 105-*b*, DFI corresponding to the feedback process ID (e.g., the feedback process ID that is associated with the data message and, likewise, the multiple TBs included in the data message). In some aspects, the DFI may include a single bit corresponding to the feedback process ID and the single bit may exclusively indicate feedback for the first TB (e.g., one of the TBs included in the data message). In some other aspects, the DFI may include a single bit corresponding to the feedback process ID and the single bit may indicate first feedback corresponding to the first TB and second feedback corresponding to the second TB. For example, the single bit may indicate bundled feedback for the first TB and the second TB via a logical AND operation or a logical OR operation between the first feedback and the second feedback.

In some other aspects, the DFI may include multiple bits corresponding to the feedback process ID, and each respective bit of the multiple bits indicates respective feedback corresponding to each respective TB of the multiple TBs. For example, the DFI may include two bits corresponding to the feedback process ID, the two bits including a first bit that indicates first feedback associated with the first TB and a second bit that indicates second feedback associated with the second TB. In such examples, the DFI may include a 32-bit bitmap and the 32-bit bitmap may include multiple sets of bits, where each respective set of bits corresponds to a respective feedback process ID of multiple (unique) feedback process IDs. For example, a first set of multiple (e.g., two) bits may correspond to the feedback process ID associated with the data message, a second set of multiple (e.g., two) bits may correspond to a second feedback process ID associated with a second data message, a third set of multiple (e.g., two) bits may correspond to a third feedback process ID associated with a third data message, and so on.

In some of such examples in which the DFI includes multiple sets of bits (each set of bits corresponding to a different feedback process ID), the UE 115-*b* and the network entity 105-*b* may support a mutually understood rule (which may be preconfigured or signaled, such as signaled via the configuration information) according to which the UE 115-*b* and the network entity 105-*b* handle scenarios in which a feedback process ID of the multiple different feedback process IDs is associated with a single TB. For example, if the second set of multiple bits that corresponds to the second feedback process ID associated with the second data message is also associated with a single TB, the UE 115-*b* and the network entity 105-*b* may expect a first bit of the second set of multiple bits to indicate feedback for the single TB and may handle a second bit of the second set of multiple bits in accordance with one or more of various options. In some aspects, the UE 115-*b* and the network entity 105-*b* may expect the second bit to be set to null value or a default value. Additionally, or alternatively, the UE 115-*b* may be configured (via signaling or by at least one processor of the UE 115-*b*, or both) to ignore the second bit.

At 640, the UE 115-*b* may process the DFI based on the configuration information provided by the network entity 105-*b* and based on one or more selected or preconfigured rules associated with how the UE 115-*b* is to interpret DFI that is associated with a multi-TB PUSCH transmission.

In some aspects, the UE 115-*b* may communicate with the network entity 105-*b* based on transmitting the data message and based on the DFI. For example, if the DFI indicates that the network entity 105-*b* successfully decoded the data message (e.g., successfully decoded all of the multiple TBs associated with the data message), the UE 115-*b* and the network entity 105-*b* may subsequently communicate new data. Alternatively, if the DFI indicates that the network entity 105-*b* failed to successfully decode at least one TB of the data message, the UE 115-*b* may perform one or more a partial or complete retransmissions of the data message to increase the likelihood that the network entity 105-*b* is able to successfully decode each of the multiple TBs associated with the data message. If the network entity 105-*b* successfully decodes the first TB and fails to successfully decode the second TB, the UE 115-*b* may exclusively retransmit the second TB (and refrain from retransmitting the first TB) or may retransmit both the first TB and the second TB.

Figure 7:
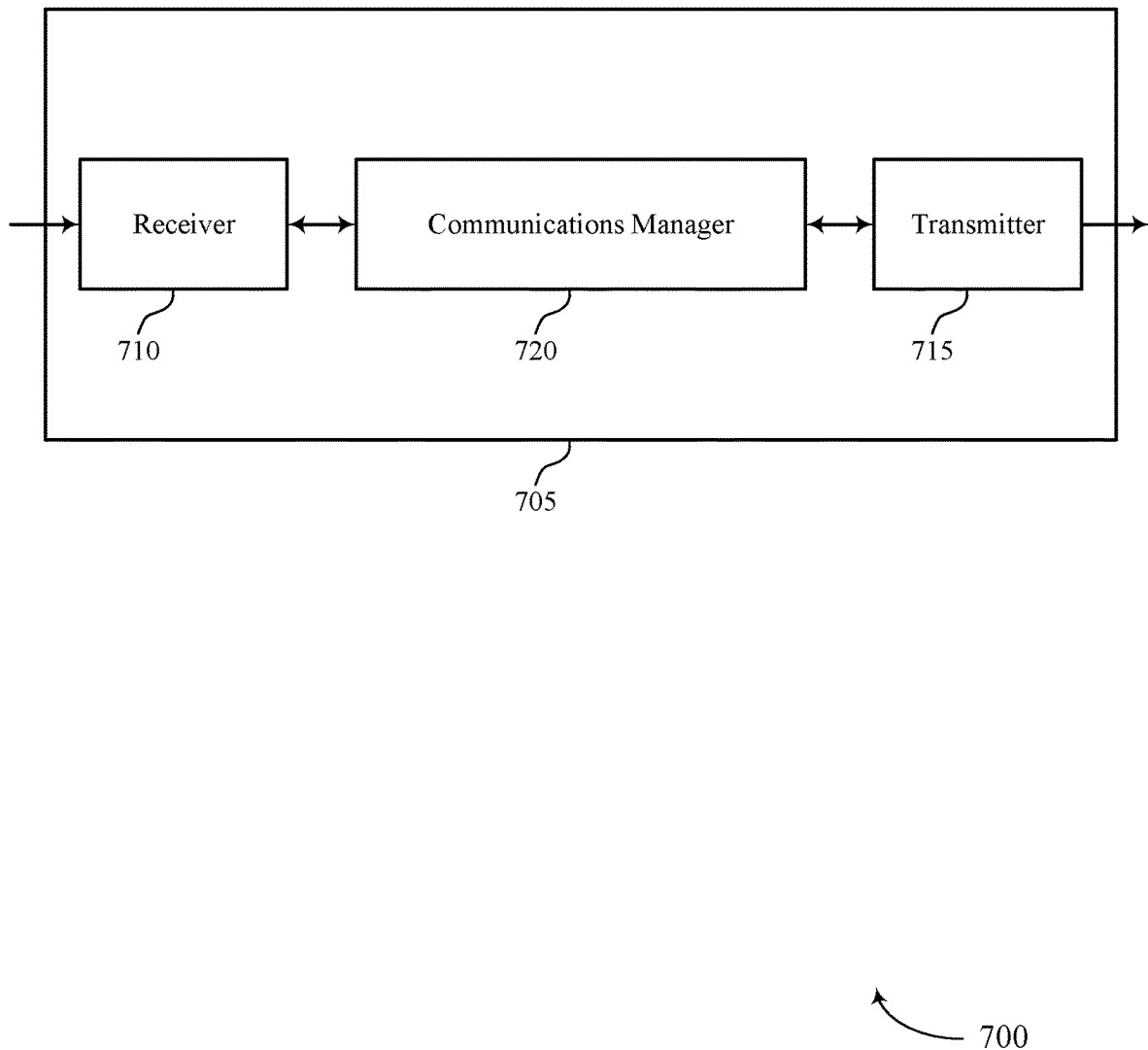
FIGS. 7 and 8 show block diagrams of devices that support multi-TB uplink shared channel transmission feedback mechanisms in accordance with one or more aspects of the present disclosure.

FIG. 7 shows a block diagram 700 of a device 705 that supports multi-TB uplink shared channel transmission feedback mechanisms in accordance with one or more aspects of the present disclosure. The device 705 may be an example of aspects of a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-TB uplink shared channel transmission feedback mechanisms). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-TB uplink shared channel transmission feedback mechanisms). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multi-TB uplink shared channel transmission feedback mechanisms as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least one processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first network node in accordance with examples as disclosed herein. For example, the communications manager 720 may be configured as or otherwise support a means for receiving, from a second network node, information that indicates that the first network node is to transmit a data message using a set of multiple TBs, where the set of multiple TBs includes a first TB and a second TB.

The communications manager 720 may be configured as or otherwise support a means for transmitting, to the second network node based on the information, the data message using the set of multiple TBs, where the data message includes a feedback process ID associated with the set of multiple TBs. The communications manager 720 may be configured as or otherwise support a means for receiving, from the second network node, DFI corresponding to the feedback process ID.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
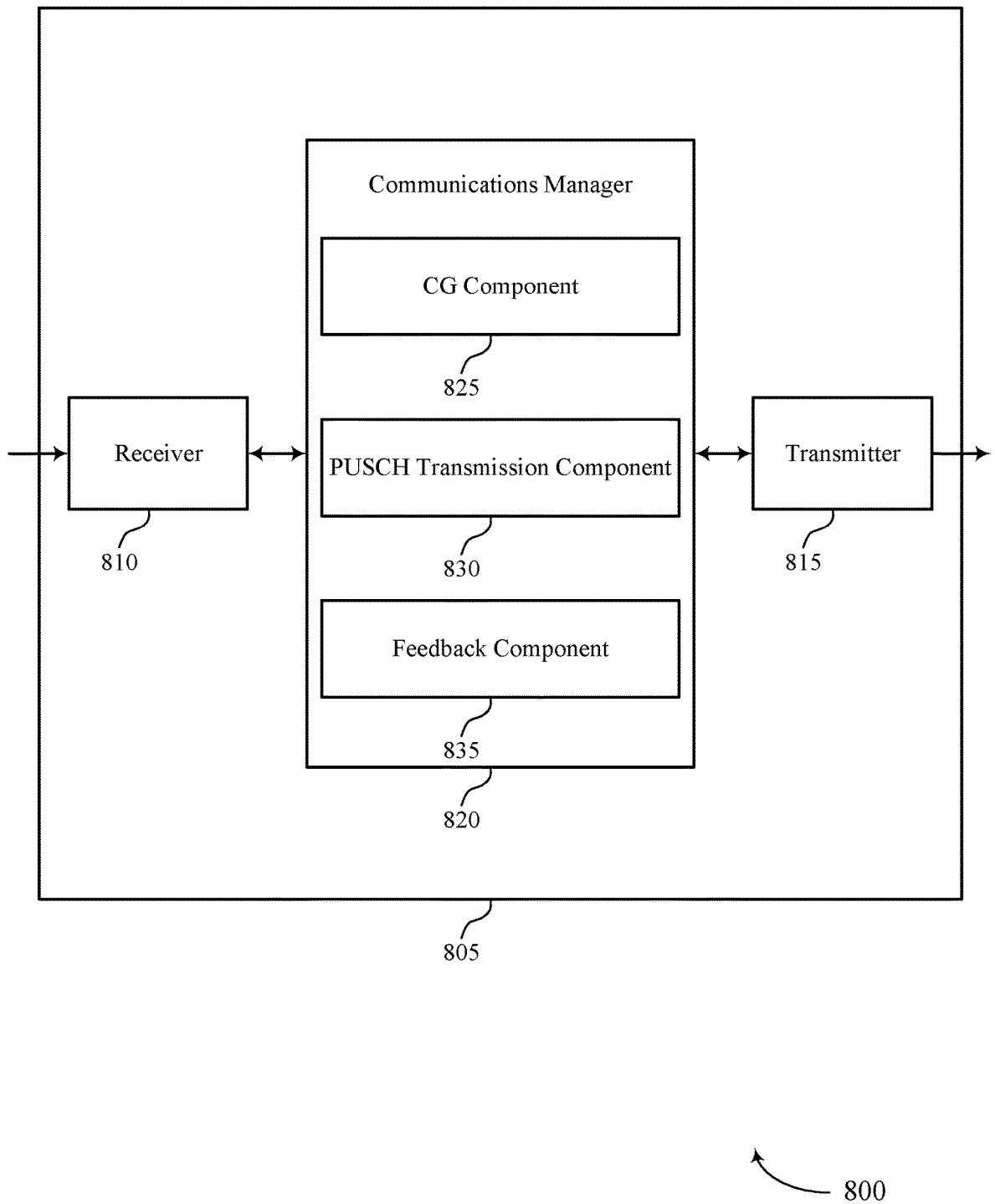

FIG. 8 shows a block diagram 800 of a device 805 that supports multi-TB uplink shared channel transmission feedback mechanisms in accordance with one or more aspects of the present disclosure. The device 805 may be an example of aspects of a device 705 or a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-TB uplink shared channel transmission feedback mechanisms). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-TB uplink shared channel transmission feedback mechanisms). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multi-TB uplink shared channel transmission feedback mechanisms as described herein. For example, the communications manager 820 may include a CG component 825, an PUSCH transmission component 830, a feedback component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first network node in accordance with examples as disclosed herein. The CG component 825 may be configured as or otherwise support a means for receiving, from a second network node, information that indicates that the first network node is to transmit a data message using a set of multiple TBs, where the set of multiple TBs includes a first TB and a second TB. The PUSCH transmission component 830 may be configured as or otherwise support a means for transmitting, to the second network node based on the information, the data message using the set of multiple TBs, where the data message includes a feedback process ID associated with the set of multiple TBs. The feedback component 835 may be configured as or otherwise support a means for receiving, from the second network node, DFI corresponding to the feedback process ID.

Figure 9:
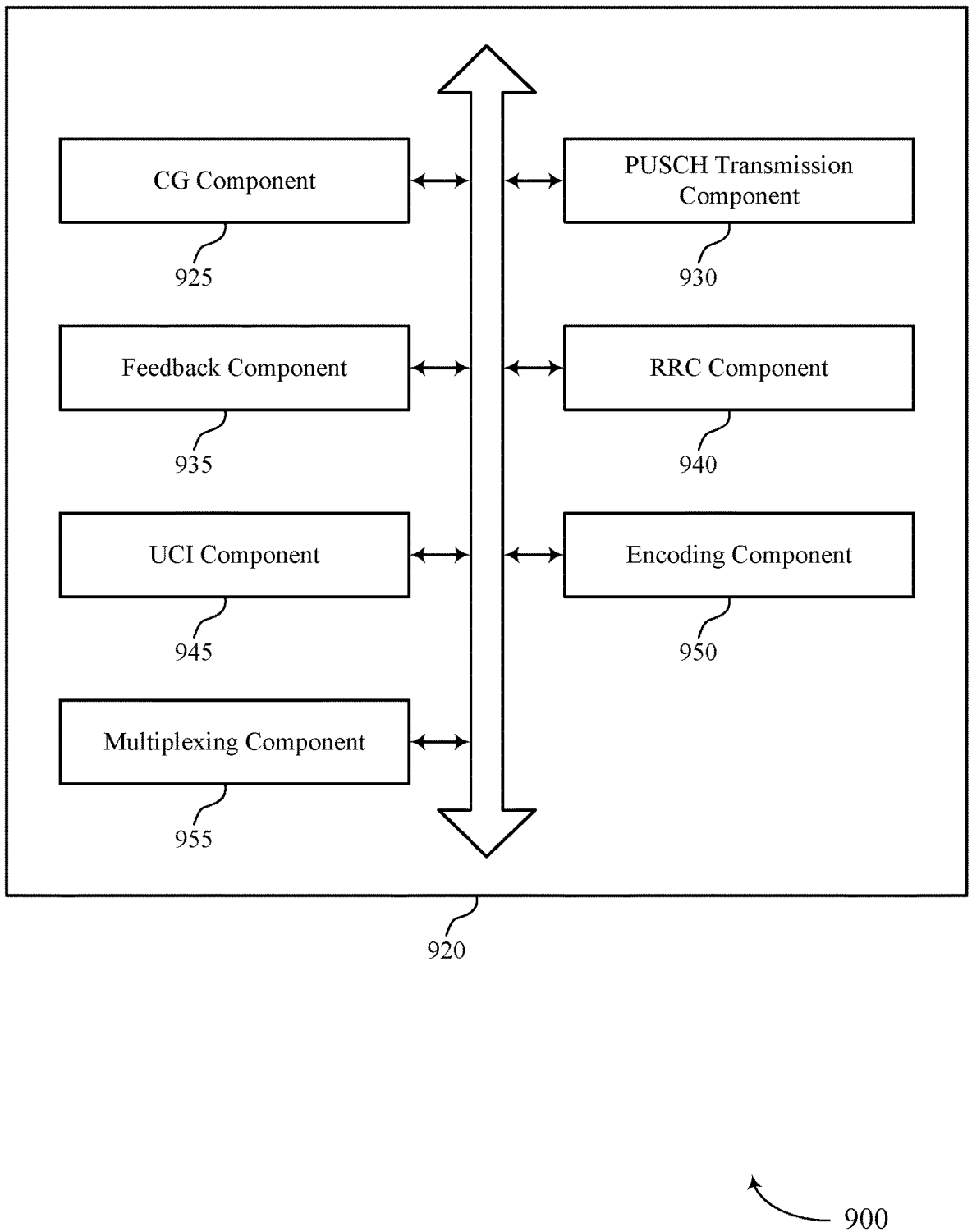
FIG. 9 shows a block diagram of a communications manager that supports multi-TB uplink shared channel transmission feedback mechanisms in accordance with one or more aspects of the present disclosure.

FIG. 9 shows a block diagram 900 of a communications manager 920 that supports multi-TB uplink shared channel transmission feedback mechanisms in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multi-TB uplink shared channel transmission feedback mechanisms as described herein. For example, the communications manager 920 may include a CG component 925, an PUSCH transmission component 930, a feedback component 935, an RRC component 940, a UCI component 945, an encoding component 950, a multiplexing component 955, or any combination thereof. Each of these components may communicate, directly or indirectly, with one another (e.g., via one or more buses).

The communications manager 920 may support wireless communication at a first network node in accordance with examples as disclosed herein. The CG component 925 may be configured as or otherwise support a means for receiving, from a second network node, information that indicates that the first network node is to transmit a data message using a set of multiple TBs, where the set of multiple TBs includes a first TB and a second TB. The PUSCH transmission component 930 may be configured as or otherwise support a means for transmitting, to the second network node based on the information, the data message using the set of multiple TBs, where the data message includes a feedback process ID associated with the set of multiple TBs. The feedback component 935 may be configured as or otherwise support a means for receiving, from the second network node, DFI corresponding to the feedback process ID.

In some examples, to support receiving the DFI, the feedback component 935 may be configured as or otherwise support a means for receiving DCI including the DFI, where the DFI includes a first bit corresponding to the feedback process ID, and where the first bit indicates first feedback exclusively corresponding to the first TB.

In some examples, the DFI is a 16-bit bitmap. In some examples, the 16-bit bitmap includes the first bit. In some examples, the 16-bit bitmap excludes any feedback corresponding to the second TB.

In some examples, to support receiving the DFI, the feedback component 935 may be configured as or otherwise support a means for receiving DCI including the DFI, where the DFI includes a first bit corresponding to the feedback process ID, and where the first bit indicates first feedback corresponding to the first TB and second feedback corresponding to the second TB.

In some examples, the first bit is a first value or a second value. In some examples, the first value indicates the first feedback and the second feedback are each a respective ACK. In some examples, the second value indicates at least one of the first feedback or the second feedback is a NACK.

In some examples, the DFI includes a set of multiple bits. In some examples, the set of multiple bits includes the first bit. In some examples, each respective bit of the set of multiple bits corresponds to a respective feedback process ID of a set of multiple feedback process IDs. In some examples, the set of multiple feedback process IDs includes the feedback process ID associated with the set of multiple TBs. In some examples, the set of multiple feedback process IDs are all different.

In some examples, the first bit corresponds to a logical AND operation between the first feedback and the second feedback.

In some examples, the first bit corresponds to a logical OR operation between the first feedback and the second feedback.

In some examples, to support receiving the DFI, the feedback component 935 may be configured as or otherwise support a means for receiving DCI including the DFI, where the DFI includes a set of multiple bits corresponding to the feedback process ID, where each respective bit of the set of multiple bits indicates respective feedback corresponding to each respective TB of the set of multiple TBs.

In some examples, a first bit of the set of multiple bits indicates first feedback corresponding to the first TB and a second bit of the set of multiple bits indicates second feedback corresponding to the second TB.

In some examples, the DFI is a 32-bit bitmap including the set of multiple bits. In some examples, the 32-bit bitmap includes the first bit and the second bit.

In some examples, the set of multiple bits includes multiple sets of bits. In some examples, each respective set of bits of the multiple sets of bits corresponds to a respective feedback process ID of a set of multiple feedback process IDs. In some examples, the set of multiple feedback process IDs includes the feedback process ID associated with the set of multiple TBs. In some examples, the set of multiple feedback process IDs are all different.

In some examples, the second bit is a null value or a default value; or the first network node ignores the second bit.

In some examples, a DCI format associated with both the DCI including the DFI and a scheduling DCI has a fixed size. In some examples, the DCI including the DFI includes a first quantity of bits. In some examples, the scheduling DCI includes a second quantity of bits. In some examples, the fixed size is equal to a greater of the first quantity of bits and the second quantity of bits.

In some examples, the set of multiple bits includes the multiple sets of bits if a scheduling DCI includes a quantity of bits equal to or greater than a total quantity of bits of the DCI including the multiple sets of bits.

In some examples, the RRC component 940 may be configured as or otherwise support a means for receiving, from the second network node, configuration information via RRC signaling. In some examples, the feedback component 935 may be configured as or otherwise support a means for processing, based on the configuration information, the DFI.

In some examples, the UCI component 945 may be configured as or otherwise support a means for transmitting UCI associated with the data message, where the UCI includes a set of multiple NDI fields and a set of multiple RV fields, where a respective NDI field of the set of multiple NDI fields and a respective RV field of the set of multiple RV fields correspond to a respective TB of the set of multiple TBs.

In some examples, the encoding component 950 may be configured as or otherwise support a means for encoding the UCI to obtain a single UCI message including the set of multiple NDI fields and the set of multiple RV fields, where transmitting the UCI includes transmitting the single UCI message.

In some examples, the multiplexing component 955 may be configured as or otherwise support a means for multiplexing the single UCI message on one or more layers associated with one TB of the set of multiple TBs, where transmitting the UCI includes transmitting the single UCI message on the one or more layers.

In some examples, the multiplexing component 955 may be configured as or otherwise support a means for multiplexing the single UCI message on a first set of one or more layers associated with the first TB of the set of multiple TBs and on a second set of one or more layers associated with the second TB of the set of multiple TB s, where transmitting the UCI includes transmitting the single UCI message on the first set of one or more layers and on the second set of one or more layers.

In some examples, the encoding component 950 may be configured as or otherwise support a means for encoding the UCI to obtain a set of multiple UCI messages, where the set of multiple UCI messages includes a first UCI message and a second UCI message, where the first UCI message includes a first NDI field of the set of multiple NDI fields and a first RV field of the set of multiple RV fields, and where the second UCI message includes a second NDI field of the set of multiple NDI fields and a second RV field of the set of multiple RV fields. In some examples, the multiplexing component 955 may be configured as or otherwise support a means for multiplexing the first UCI message on a first set of one or more layers associated with the first TB and the second UCI message on a second set of one or more layers associated with the second TB, where transmitting the UCI includes transmitting the first UCI message on the first set of one or more layers and the second UCI message on the second set of one or more layers.

In some examples, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB includes the second RV field, the second NDI field, a second feedback process ID field, and a second channel occupancy time sharing information field, where the second feedback process ID field and the second channel occupancy time sharing information field include same information as the first feedback process ID field and the first channel occupancy time sharing information field, respectively.

In some examples, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB exclusively includes the second RV field and the second NDI field.

In some examples, the data message is a CG-PUSCH transmission or a DG-PUSCH transmission.

Figure 10:
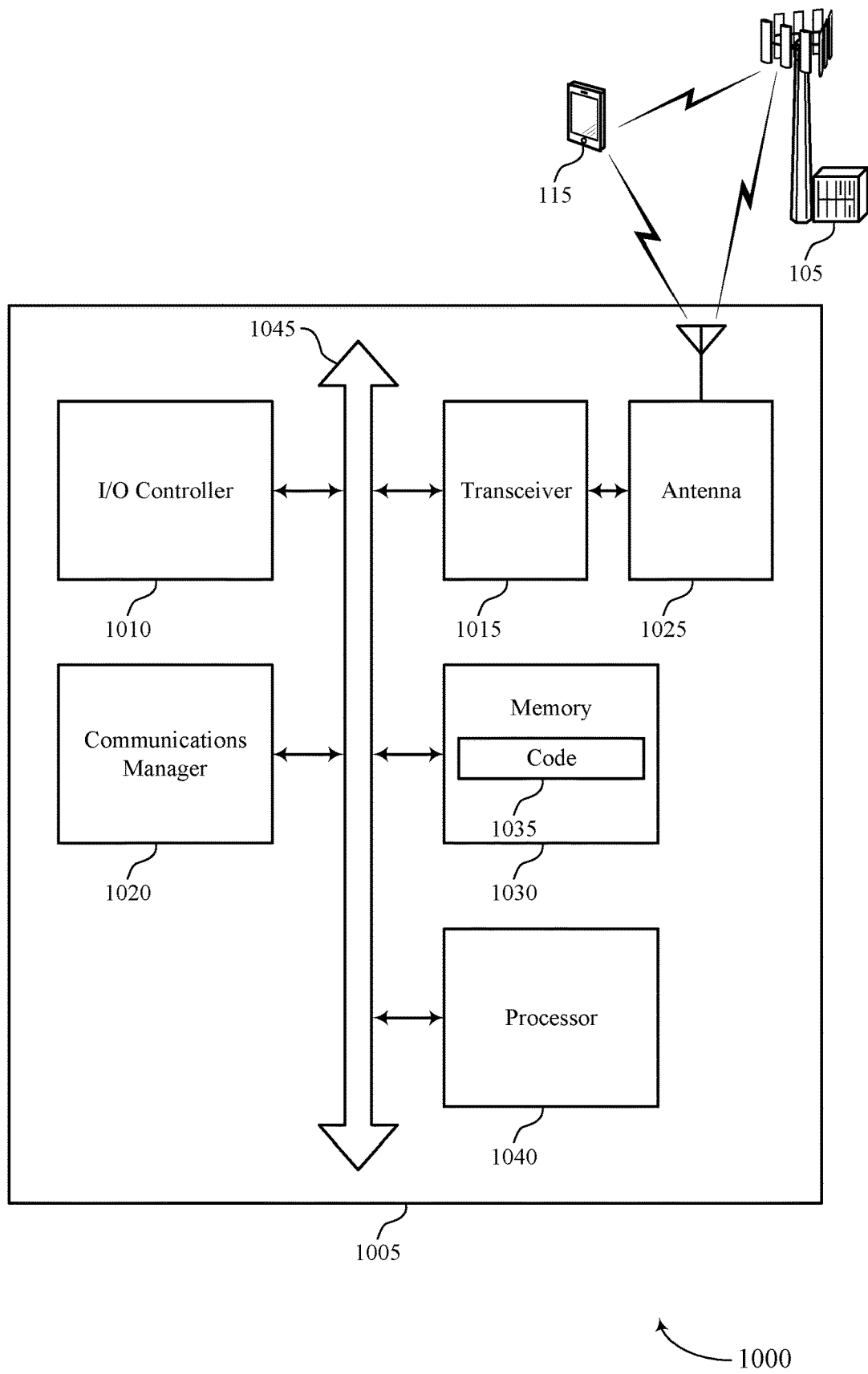
FIG. 10 shows a diagram of a system including a device that supports multi-TB uplink shared channel transmission feedback mechanisms in accordance with one or more aspects of the present disclosure.

FIG. 10 shows a diagram of a system 1000 including a device 1005 that supports multi-TB uplink shared channel transmission feedback mechanisms in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of at least one processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multi-TB uplink shared channel transmission feedback mechanisms). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first network node in accordance with examples as disclosed herein. For example, the communications manager 1020 may be configured as or otherwise support a means for receiving, from a second network node, information that indicates that the first network node is to transmit a data message using a set of multiple TBs, where the set of multiple TBs includes a first TB and a second TB. The communications manager 1020 may be configured as or otherwise support a means for transmitting, to the second network node based on the information, the data message using the set of multiple TBs, where the data message includes a feedback process ID associated with the set of multiple TBs. The communications manager 1020 may be configured as or otherwise support a means for receiving, from the second network node, DFI corresponding to the feedback process ID.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multi-TB uplink shared channel transmission feedback mechanisms as described herein, or the processor 1040 and the memory 1030 may be otherwise configured to perform or support such operations.

Figure 11:
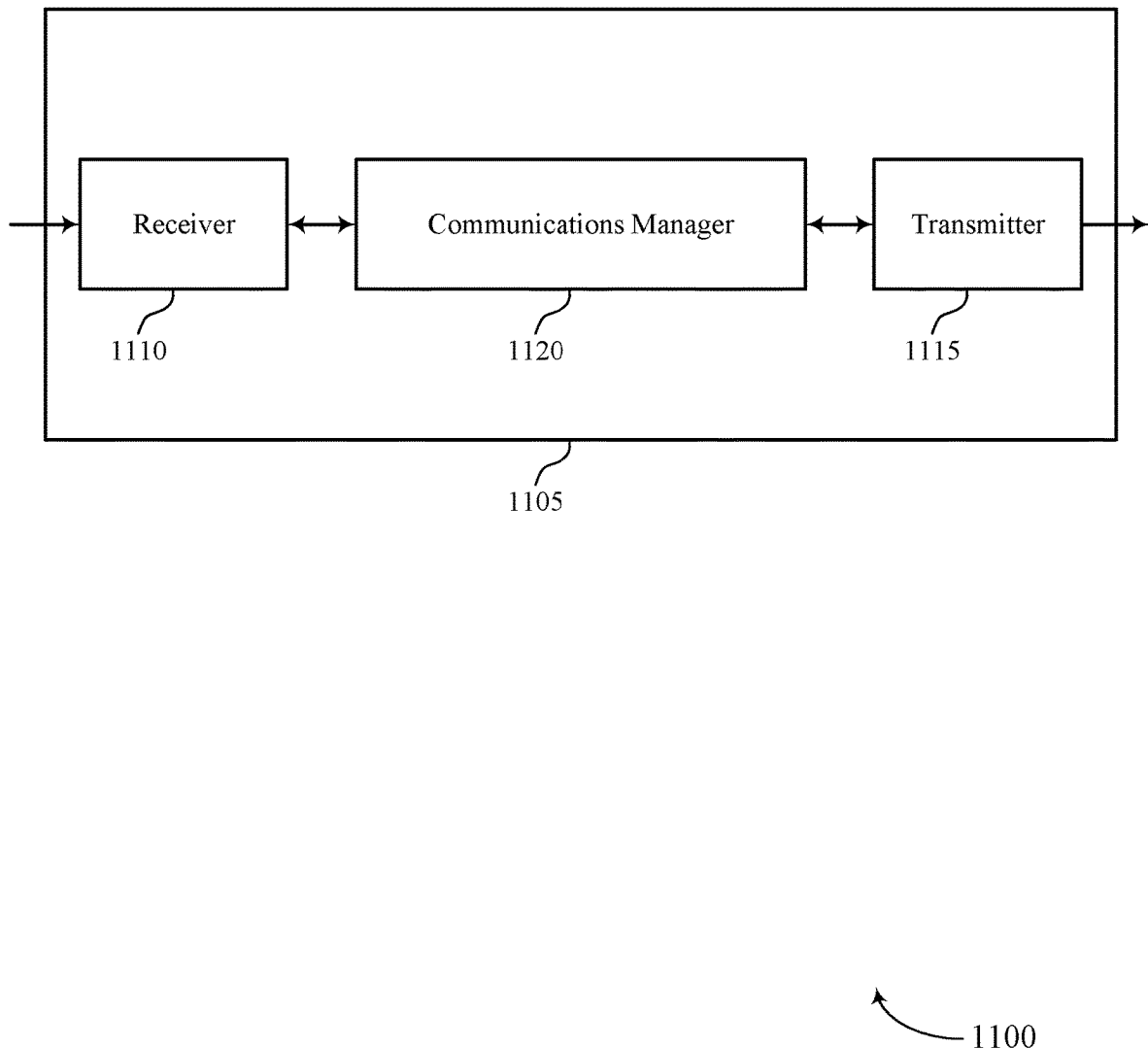
FIGS. 11 and 12 show block diagrams of devices that support multi-TB uplink shared channel transmission feedback mechanisms in accordance with one or more aspects of the present disclosure.

FIG. 11 shows a block diagram 1100 of a device 1105 that supports multi-TB uplink shared channel transmission feedback mechanisms in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of multi-TB uplink shared channel transmission feedback mechanisms as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first network node in accordance with examples as disclosed herein. For example, the communications manager 1120 may be configured as or otherwise support a means for transmitting, to a second network node, information that indicates that the second network node is to transmit a data message using a set of multiple TBs, where the set of multiple TBs includes a first TB and a second TB. The communications manager 1120 may be configured as or otherwise support a means for receiving, from the second network node based on the information, the data message including the set of multiple TBs, where the data message includes a feedback process ID associated with the set of multiple TBs. The communications manager 1120 may be configured as or otherwise support a means for transmitting, to the second network node, DFI corresponding to the feedback process ID.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
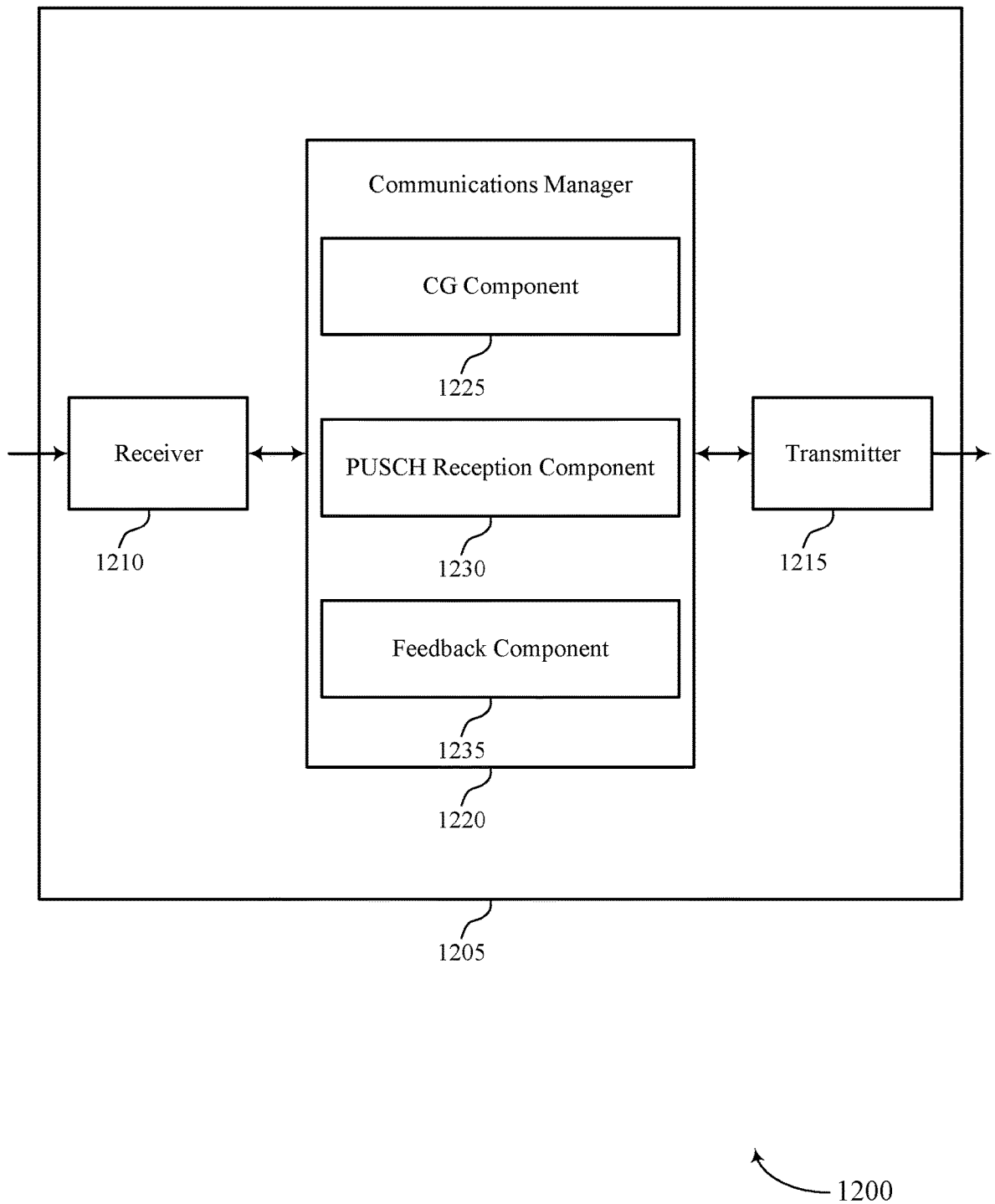

FIG. 12 shows a block diagram 1200 of a device 1205 that supports multi-TB uplink shared channel transmission feedback mechanisms in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of multi-TB uplink shared channel transmission feedback mechanisms as described herein. For example, the communications manager 1220 may include a CG component 1225, an PUSCH reception component 1230, a feedback component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a first network node in accordance with examples as disclosed herein. The CG component 1225 may be configured as or otherwise support a means for transmitting, to a second network node, information that indicates that the second network node is to transmit a data message using a set of multiple TBs, where the set of multiple TBs includes a first TB and a second TB. The PUSCH reception component 1230 may be configured as or otherwise support a means for receiving, from the second network node based on the information, the data message including the set of multiple TBs, where the data message includes a feedback process ID associated with the set of multiple TBs. The feedback component 1235 may be configured as or otherwise support a means for transmitting, to the second network node, DFI corresponding to the feedback process ID.

Figure 13:
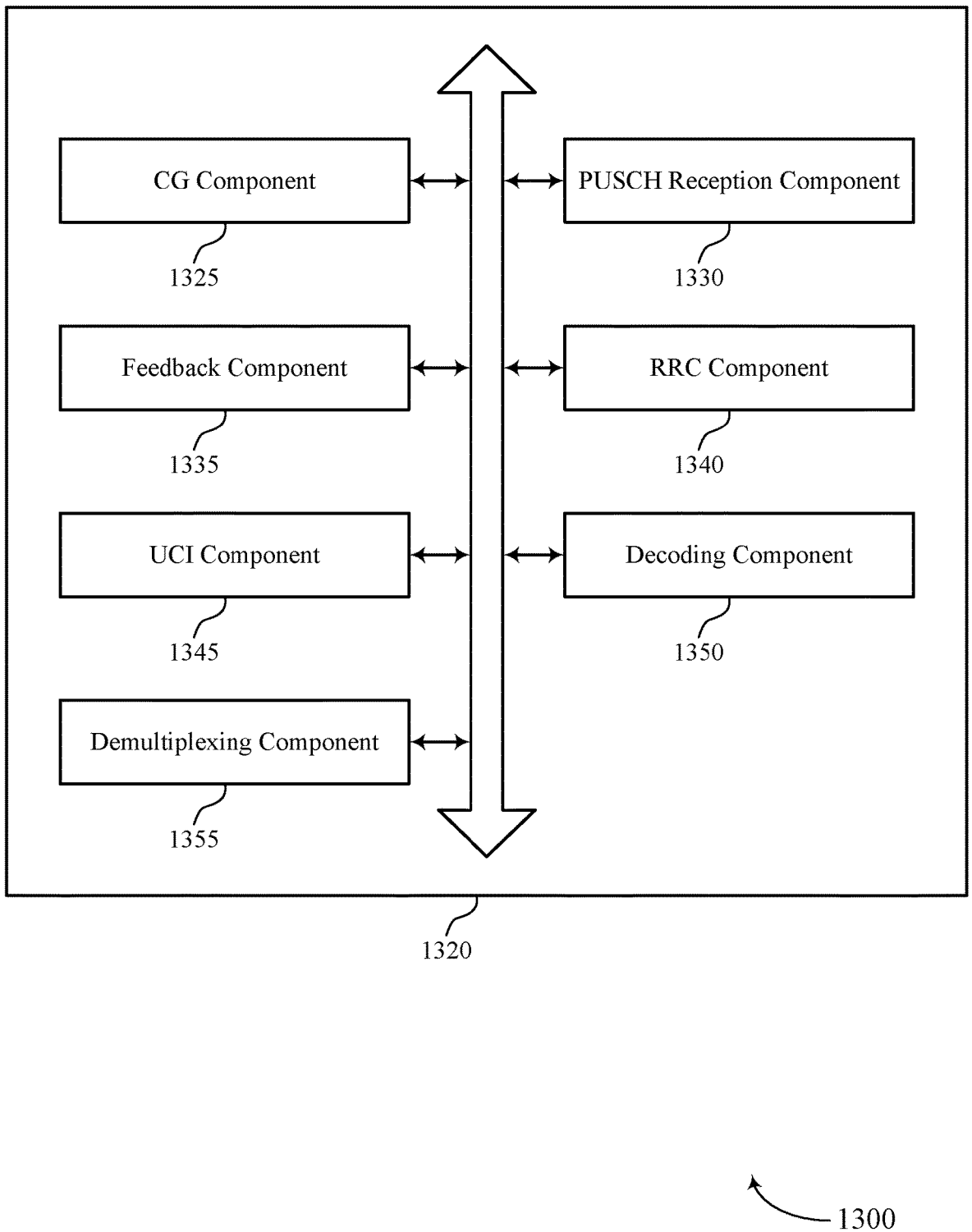
FIG. 13 shows a block diagram of a communications manager that supports multi-TB uplink shared channel transmission feedback mechanisms in accordance with one or more aspects of the present disclosure.

FIG. 13 shows a block diagram 1300 of a communications manager 1320 that supports multi-TB uplink shared channel transmission feedback mechanisms in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of multi-TB uplink shared channel transmission feedback mechanisms as described herein. For example, the communications manager 1320 may include a CG component 1325, an PUSCH reception component 1330, a feedback component 1335, an RRC component 1340, a UCI component 1345, a decoding component 1350, a demultiplexing component 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a first network node in accordance with examples as disclosed herein. The CG component 1325 may be configured as or otherwise support a means for transmitting, to a second network node, information that indicates that the second network node is to transmit a data message using a set of multiple TBs, where the set of multiple TBs includes a first TB and a second TB. The PUSCH reception component 1330 may be configured as or otherwise support a means for receiving, from the second network node based on the information, the data message including the set of multiple TBs, where the data message includes a feedback process ID associated with the set of multiple TBs. The feedback component 1335 may be configured as or otherwise support a means for transmitting, to the second network node, DFI corresponding to the feedback process ID.

In some examples, to support transmitting the DFI, the feedback component 1335 may be configured as or otherwise support a means for transmitting DCI including the DFI, where the DFI includes a first bit corresponding to the feedback process ID, and where the first bit indicates first feedback exclusively corresponding to the first TB.

In some examples, the DFI is a 16-bit bitmap. In some examples, the 16-bit bitmap includes the first bit. In some examples, the 16-bit bitmap excludes any feedback corresponding to the second TB.

In some examples, to support transmitting the DFI, the feedback component 1335 may be configured as or otherwise support a means for transmitting DCI including the DFI, where the DFI includes a first bit corresponding to the feedback process ID, and where the first bit indicates first feedback corresponding to the first TB and second feedback corresponding to the second TB.

In some examples, the first bit is a first value or a second value. In some examples, the first value indicates the first feedback and the second feedback are each a respective ACK. In some examples, the second value indicates at least one of the first feedback or the second feedback is a NACK.

In some examples, the DFI includes a set of multiple bits. In some examples, the set of multiple bits includes the first bit. In some examples, each respective bit of the set of multiple bits corresponds to a respective feedback process ID of a set of multiple feedback process IDs. In some examples, the set of multiple feedback process IDs includes the feedback process ID associated with the set of multiple TBs. In some examples, the set of multiple feedback process IDs are all different.

In some examples, the first bit corresponds to a logical AND operation between the first feedback and the second feedback.

In some examples, the first bit corresponds to a logical OR operation between the first feedback and the second feedback.

In some examples, to support transmitting the DFI, the feedback component 1335 may be configured as or otherwise support a means for transmitting DCI including the DFI, where the DFI includes a set of multiple bits corresponding to the feedback process ID, where each respective bit of the set of multiple bits indicates respective feedback corresponding to each respective TB of the set of multiple TBs.

In some examples, a first bit of the set of multiple bits indicates first feedback corresponding to the first TB and a second bit of the set of multiple bits indicates second feedback corresponding to the second TB.

In some examples, the DFI is a 32-bit bitmap including the set of multiple bits. In some examples, the 32-bit bitmap includes the first bit and the second bit.

In some examples, the set of multiple bits includes multiple sets of bits. In some examples, each respective set of bits of the multiple sets of bits corresponds to a respective feedback process ID of a set of multiple feedback process IDs. In some examples, the set of multiple feedback process IDs includes the feedback process ID associated with the set of multiple TBs. In some examples, the set of multiple feedback process IDs are all different.

In some examples, the second bit is a null value or a default value; or the second network node is to ignore the second bit.

In some examples, a DCI format associated with both the DCI including the DFI and a scheduling DCI has a fixed size. In some examples, the DCI including the DFI includes a first quantity of bits. In some examples, the scheduling DCI includes a second quantity of bits. In some examples, the fixed size is equal to a greater of the first quantity of bits and the second quantity of bits.

In some examples, the set of multiple bits includes the multiple sets of bits if a scheduling DCI includes a quantity of bits equal to or greater than a total quantity of bits of the DCI including the multiple sets of bits.

In some examples, the RRC component 1340 may be configured as or otherwise support a means for transmitting, from the second network node, configuration information via RRC signaling, where the configuration information is associated with the DFI.

In some examples, the UCI component 1345 may be configured as or otherwise support a means for receiving UCI associated with the data message, where the UCI includes a set of multiple NDI fields and a set of multiple RV fields, where a respective NDI field of the set of multiple NDI fields and a respective RV field of the set of multiple RV fields correspond to a respective TB of the set of multiple TBs.

In some examples, the UCI is a single UCI message, and the decoding component 1350 may be configured as or otherwise support a means for decoding the UCI to obtain the single UCI message including the set of multiple NDI fields and the set of multiple RV fields.

In some examples, the demultiplexing component 1355 may be configured as or otherwise support a means for demultiplexing the single UCI message from one or more layers associated with one TB of the set of multiple TBs, where receiving the UCI includes receiving the single UCI message on the one or more layers.

In some examples, the demultiplexing component 1355 may be configured as or otherwise support a means for demultiplexing the single UCI message from a first set of one or more layers associated with the first TB of the set of multiple TBs and from a second set of one or more layers associated with the second TB of the set of multiple TBs, where receiving the UCI includes receiving the single UCI message on the first set of one or more layers and on the second set of one or more layers.

In some examples, the UCI is a set of multiple UCI messages, and the decoding component 1350 may be configured as or otherwise support a means for decoding the UCI to obtain the set of multiple UCI messages, where the set of multiple UCI messages includes a first UCI message and a second UCI message, where the first UCI message includes a first NDI field of the set of multiple NDI fields and a first RV field of the set of multiple RV fields, and where the second UCI message includes a second NDI field of the set of multiple NDI fields and a second RV field of the set of multiple RV fields. In some examples, the UCI is a set of multiple UCI messages, and the demultiplexing component 1355 may be configured as or otherwise support a means for demultiplexing the first UCI message on a first set of one or more layers associated with the first TB and the second UCI message on a second set of one or more layers associated with the second TB, where receiving the UCI includes receiving the first UCI message on the first set of one or more layers and the second UCI message on the second set of one or more layers.

In some examples, the first UCI message of the set of multiple UCI messages associated with the first TB includes the first RV field, the first NDI field, a first feedback process ID field, and a first COT sharing information field; and the second UCI message of the set of multiple UCI messages associated with the second TB includes the second RV field, the second NDI field, a second feedback process ID field, and a second channel occupancy time sharing information field, where the second feedback process ID field and the second COT sharing information field include same information as the first feedback process ID field and the first channel occupancy time sharing information field, respectively.

In some examples, the first UCI message of the set of multiple UCI messages associated with the first TB includes the first RV field, the first NDI field, a first feedback process ID field, and a first channel occupancy time sharing information field; and the second UCI message of the set of multiple UCI messages associated with the second TB exclusively includes the second RV field and the second NDI field.

In some examples, the data message is a CG-PUSCH transmission or a DG-PUSCH transmission.

Figure 14:
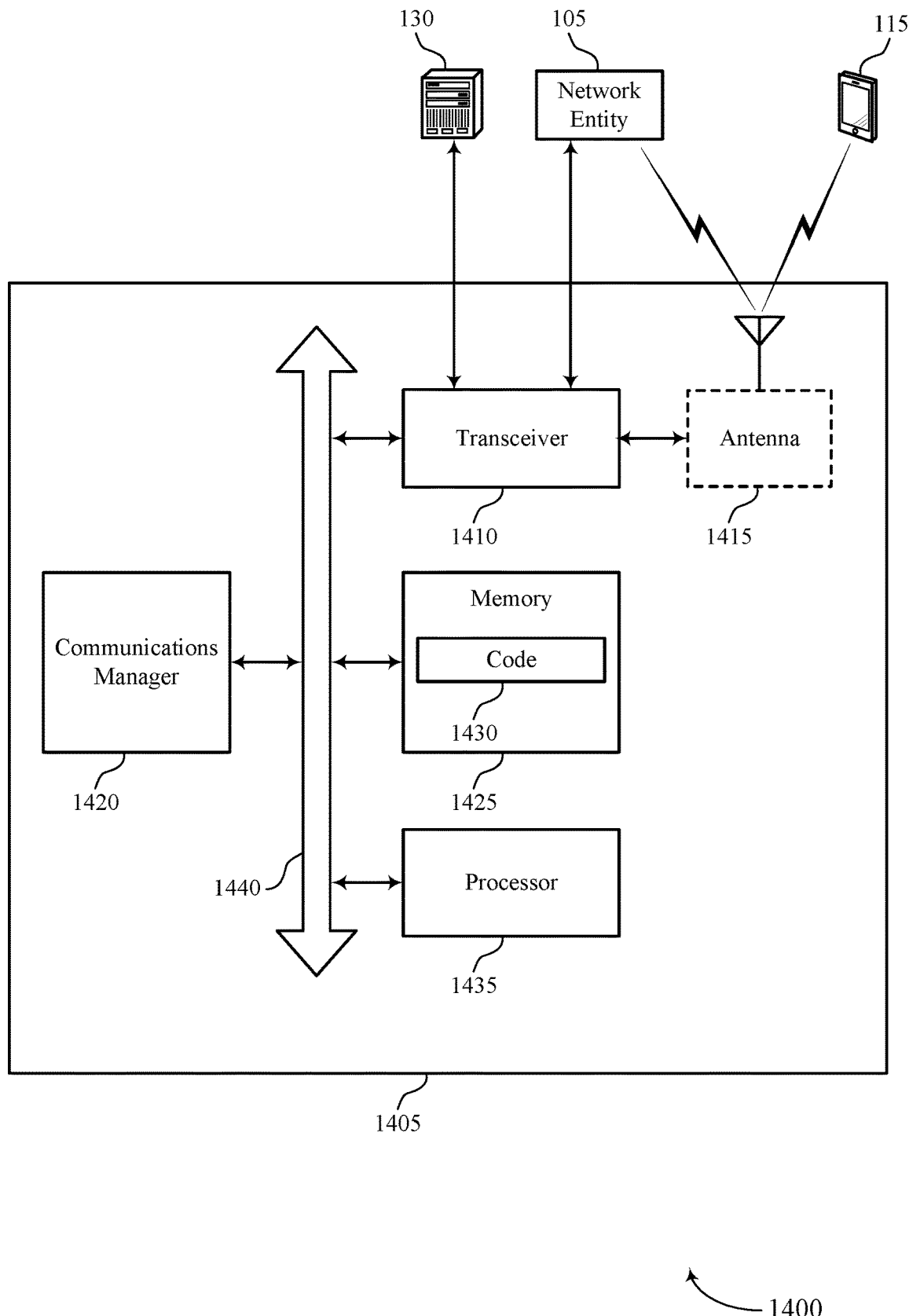
FIG. 14 shows a diagram of a system including a device that supports multi-TB uplink shared channel transmission feedback mechanisms in accordance with one or more aspects of the present disclosure.

FIG. 14 shows a diagram of a system 1400 including a device 1405 that supports multi-TB uplink shared channel transmission feedback mechanisms in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting multi-TB uplink shared channel transmission feedback mechanisms). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a first network node in accordance with examples as disclosed herein. For example, the communications manager 1420 may be configured as or otherwise support a means for transmitting, to a second network node, information that indicates that the second network node is to transmit a data message using a set of multiple TBs, where the set of multiple TBs includes a first TB and a second TB. The communications manager 1420 may be configured as or otherwise support a means for receiving, from the second network node based on the information, the data message including the set of multiple TBs, where the data message includes a feedback process ID associated with the set of multiple TBs. The communications manager 1420 may be configured as or otherwise support a means for transmitting, to the second network node, DFI corresponding to the feedback process ID.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of multi-TB uplink shared channel transmission feedback mechanisms as described herein, or the processor 1435 and the memory 1425 may be otherwise configured to perform or support such operations.

Figure 15:
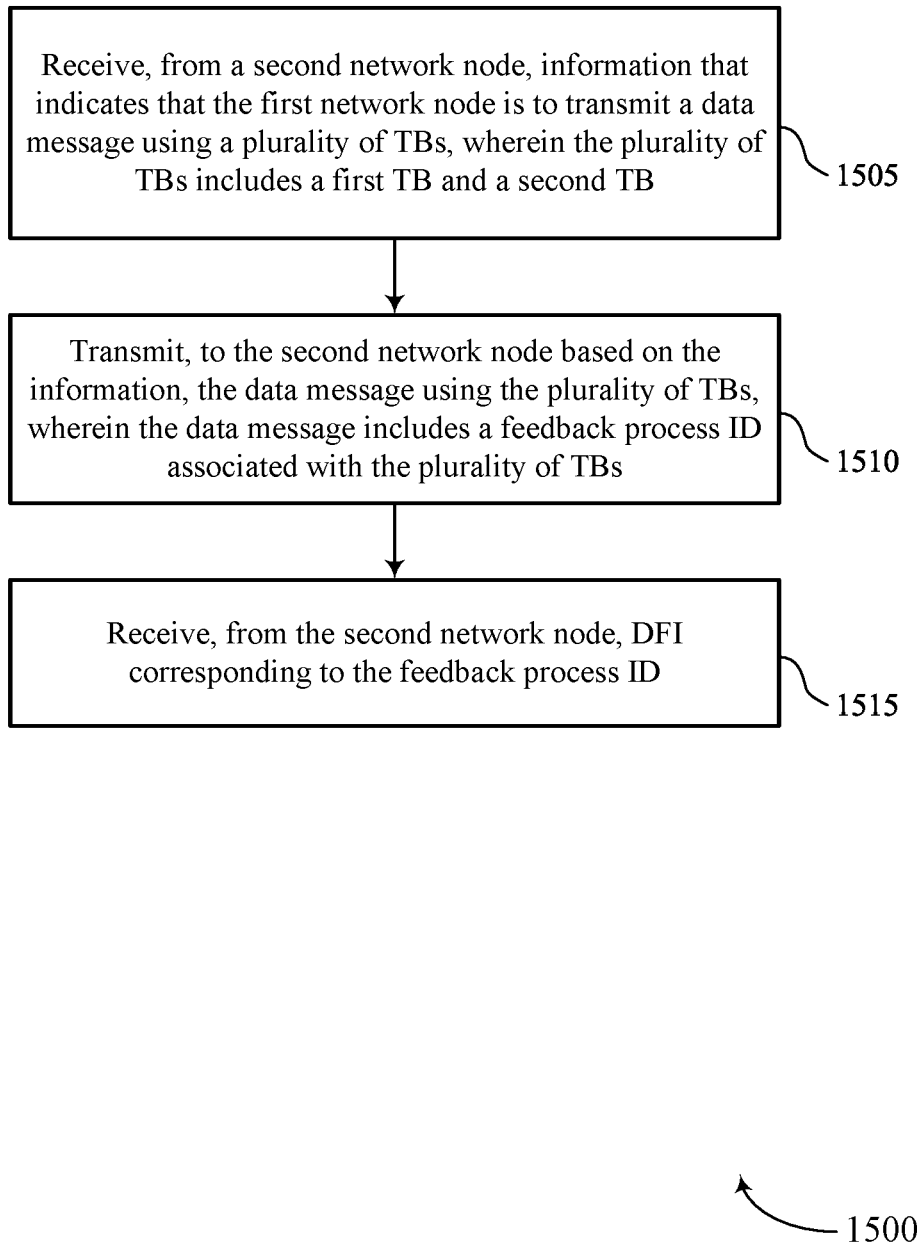
FIGS. 15 and 16 show flowcharts illustrating methods that support multi-TB uplink shared channel transmission feedback mechanisms in accordance with one or more aspects of the present disclosure.

FIG. 15 shows a flowchart illustrating a method 1500 that supports multi-TB uplink shared channel transmission feedback mechanisms in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a second network node, information that indicates that the first network node is to transmit a data message using a set of multiple TBs, where the set of multiple TBs includes a first TB and a second TB. The operations of 1505 may be performed in accordance with examples as disclosed herein. In some examples, aspects of the operations of 1505 may be performed by a CG component 925 as described with reference to FIG. 9.

At 1510, the method may include transmitting, to the second network node based on the information, the data message using the set of multiple TBs, where the data message includes a feedback process ID associated with the set of multiple TBs. The operations of 1510 may be performed in accordance with examples as disclosed herein. In some examples, aspects of the operations of 1510 may be performed by an PUSCH transmission component 930 as described with reference to FIG. 9.

At 1515, the method may include receiving, from the second network node, DFI corresponding to the feedback process ID. The operations of 1515 may be performed in accordance with examples as disclosed herein. In some examples, aspects of the operations of 1515 may be performed by a feedback component 935 as described with reference to FIG. 9.

Figure 16:
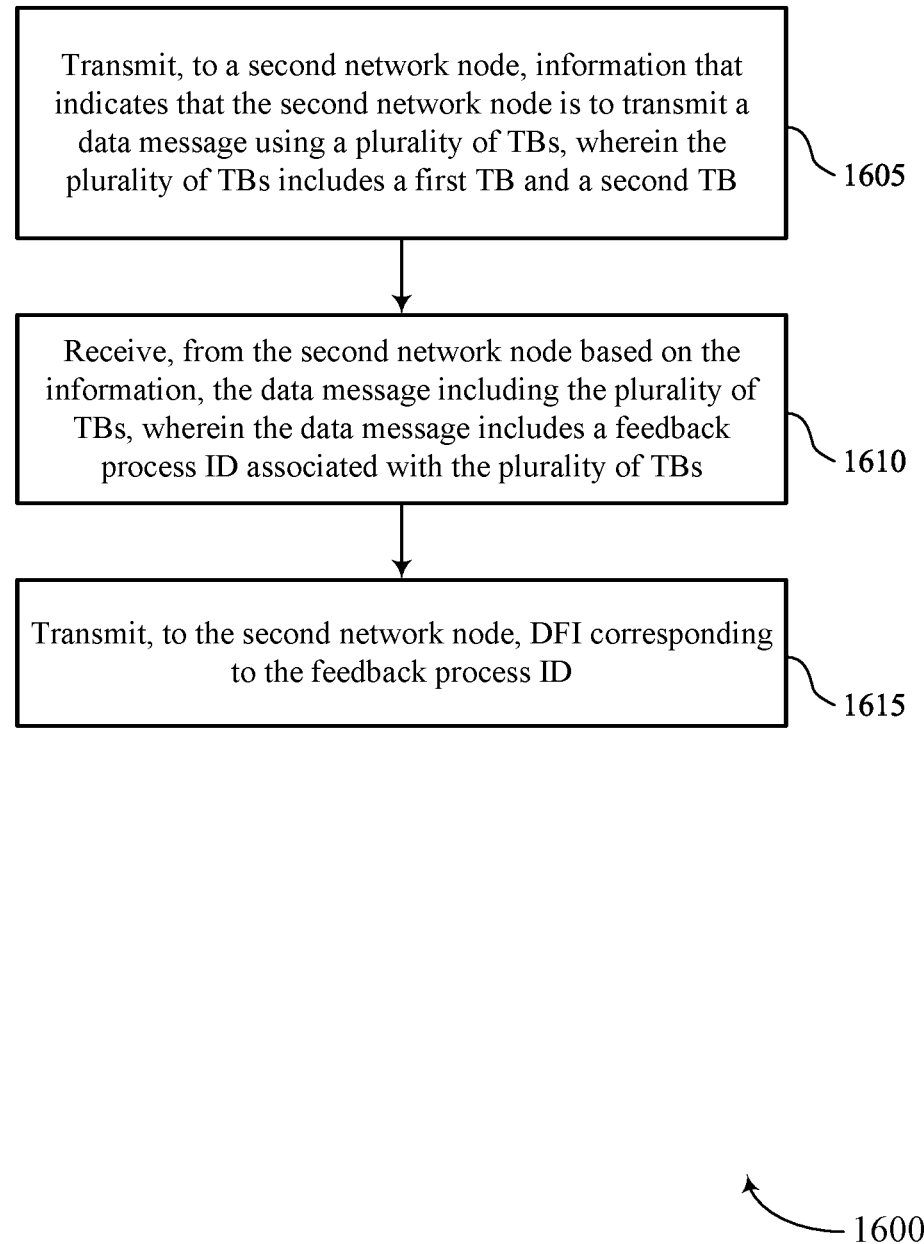

FIG. 16 shows a flowchart illustrating a method 1600 that supports multi-TB uplink shared channel transmission feedback mechanisms in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a second network node, information that indicates that the second network node is to transmit a data message using a set of multiple TBs, where the set of multiple TBs includes a first TB and a second TB. The operations of 1605 may be performed in accordance with examples as disclosed herein. In some examples, aspects of the operations of 1605 may be performed by a CG component 1325 as described with reference to FIG. 13.

At 1610, the method may include receiving, from the second network node based on the information, the data message including the set of multiple TBs, where the data message includes a feedback process ID associated with the set of multiple TBs. The operations of 1610 may be performed in accordance with examples as disclosed herein. In some examples, aspects of the operations of 1610 may be performed by an PUSCH reception component 1330 as described with reference to FIG. 13.

At 1615, the method may include transmitting, to the second network node, DFI corresponding to the feedback process ID. The operations of 1615 may be performed in accordance with examples as disclosed herein. In some examples, aspects of the operations of 1615 may be performed by a feedback component 1335 as described with reference to FIG. 13.

The following provides an overview of aspects of the present disclosure:

Aspect 1: A method for wireless communication at a first network node, comprising: receiving, from a second network node, information that indicates that the first network node is to transmit a data message using a plurality of TBs, wherein the plurality of TBs includes a first TB and a second TB; transmitting, to the second network node based on the information, the data message using the plurality of TBs, wherein the data message includes a feedback process ID associated with the plurality of TBs; and receiving, from the second network node, DFI corresponding to the feedback process ID.

Aspect 2: The method of aspect 1, wherein receiving the DFI further comprises: receiving DCI including the DFI, wherein the DFI includes a first bit corresponding to the feedback process ID, and wherein the first bit indicates first feedback exclusively corresponding to the first TB.

Aspect 3: The method of aspect 2, wherein the DFI is a 16-bit bitmap, the 16-bit bitmap includes the first bit, and the 16-bit bitmap excludes any feedback corresponding to the second TB.

Aspect 4: The method of any of aspects 1 through 3, wherein receiving the DFI further comprises: receiving DCI including the DFI, wherein the DFI includes a first bit corresponding to the feedback process ID, and wherein the first bit indicates first feedback corresponding to the first TB and second feedback corresponding to the second TB.

Aspect 5: The method of aspect 4, wherein the first bit is a first value or a second value, the first value indicates the first feedback and the second feedback are each a respective ACK, and the second value indicates at least one of the first feedback or the second feedback is a NACK.

Aspect 6: The method of any of aspects 4 through 5, wherein the DFI includes a plurality of bits, the plurality of bits includes the first bit, each respective bit of the plurality of bits corresponds to a respective feedback process ID of a plurality of feedback process IDs, the plurality of feedback process IDs includes the feedback process ID associated with the plurality of TBs, and the plurality of feedback process IDs are all different.

Aspect 7: The method of any of aspects 4 through 6, wherein the first bit corresponds to a logical AND operation between the first feedback and the second feedback.

Aspect 8: The method of any of aspects 4 through 7, wherein the first bit corresponds to a logical OR operation between the first feedback and the second feedback.

Aspect 9: The method of any of aspects 1 through 8, wherein receiving the DFI further comprises: receiving DCI including the DFI, wherein the DFI includes a plurality of bits corresponding to the feedback process ID, wherein each respective bit of the plurality of bits indicates respective feedback corresponding to each respective TB of the plurality of TBs.

Aspect 10: The method of aspect 9, wherein a first bit of the plurality of bits indicates first feedback corresponding to the first TB and a second bit of the plurality of bits indicates second feedback corresponding to the second TB.

Aspect 11: The method of aspect 10, wherein the DFI is a 32-bit bitmap including the plurality of bits, the 32-bit bitmap includes the first bit and the second bit.

Aspect 12: The method of any of aspects 9 through 11, wherein the plurality of bits includes multiple sets of bits, each respective set of bits of the multiple sets of bits corresponds to a respective feedback process ID of a plurality of feedback process IDs, the plurality of feedback process IDs includes the feedback process ID associated with the plurality of TBs, and the plurality of feedback process IDs are all different.

Aspect 13: The method of aspect 12, wherein the multiple sets of bits includes a first set of bits and a second set of bits, wherein the first set of bits corresponds to the feedback process ID associated with the plurality of TBs, and wherein the second set of bits corresponds to a second feedback process ID, wherein the second feedback process ID is associated with a single TB, wherein the second set of bits includes a first bit and a second bit, wherein the first bit indicates feedback corresponding to the single TB associated with the second feedback process ID, and wherein the second bit is a null value or a default value; or the first network node ignores the second bit.

Aspect 14: The method of any of aspects 12 through 13, wherein a DCI format associated with both the DCI including the DFI and a scheduling DCI has a fixed size, the DCI including the DFI comprises a first quantity of bits, the scheduling DCI comprises a second quantity of bits, and the fixed size is equal to a greater of the first quantity of bits and the second quantity of bits.

Aspect 15: The method of any of aspects 12 through 14, wherein the plurality of bits includes the multiple sets of bits if a scheduling DCI comprises a quantity of bits equal to or greater than a total quantity of bits of the DCI including the multiple sets of bits.

Aspect 16: The method of any of aspects 1 through 15, further comprising: receiving, from the second network node, configuration information via RRC signaling; and processing, based on the configuration information, the DFI.

Aspect 17: The method of any of aspects 1 through 16, further comprising: transmitting UCI associated with the data message, wherein the UCI includes a plurality of NDI fields and a plurality of RV fields, wherein a respective NDI field of the plurality of NDI fields and a respective RV field of the plurality of RV fields correspond to a respective TB of the plurality of TBs.

Aspect 18: The method of aspect 17, further comprising: encoding the UCI to obtain a single UCI message including the plurality of NDI fields and the plurality of RV fields, wherein transmitting the UCI comprises transmitting the single UCI message.

Aspect 19: The method of aspect 18, further comprising: multiplexing the single UCI message on one or more layers associated with one TB of the plurality of TBs, wherein transmitting the UCI comprises transmitting the single UCI message on the one or more layers.

Aspect 20: The method of any of aspects 18 through 19, further comprising: multiplexing the single UCI message on a first set of one or more layers associated with the first TB of the plurality of TBs and on a second set of one or more layers associated with the second TB of the plurality of TBs, wherein transmitting the UCI comprises transmitting the single UCI message on the first set of one or more layers and on the second set of one or more layers.

Aspect 21: The method of any of aspects 17 through 20, further comprising: encoding the UCI to obtain a plurality of UCI messages, wherein the plurality of UCI messages includes a first UCI message and a second UCI message, wherein the first UCI message includes a first NDI field of the plurality of NDI fields and a first RV field of the plurality of RV fields, and wherein the second UCI message includes a second NDI field of the plurality of NDI fields and a second RV field of the plurality of RV fields; and multiplexing the first UCI message on a first set of one or more layers associated with the first TB and the second UCI message on a second set of one or more layers associated with the second TB, wherein transmitting the UCI comprises transmitting the first UCI message on the first set of one or more layers and the second UCI message on the second set of one or more layers.

Aspect 22: The method of aspect 21, wherein the first UCI message of the plurality of UCI messages associated with the first TB includes the first RV field, the first NDI field, a first feedback process ID field, and a first channel occupancy time sharing information field; and the second UCI message of the plurality of UCI messages associated with the second TB includes the second RV field, the second NDI field, a second feedback process ID field, and a second channel occupancy time sharing information field, wherein the second feedback process ID field and the second channel occupancy time sharing information field comprise same information as the first feedback process ID field and the first channel occupancy time sharing information field, respectively.

Aspect 23: The method of any of aspects 21 through 22, wherein the first UCI message of the plurality of UCI messages associated with the first TB includes the first RV field, the first NDI field, a first feedback process ID field, and a first channel occupancy time sharing information field; and the second UCI message of the plurality of UCI messages associated with the second TB exclusively includes the second RV field and the second NDI field.

Aspect 24: The method of any of aspects 1 through 23, wherein the data message is a CG-PUSCH transmission or a DG-PUSCH transmission.

Aspect 25: A method for wireless communication at a first network node, comprising: transmitting, to a second network node, information that indicates that the second network node is to transmit a data message using a plurality of TBs, wherein the plurality of TBs includes a first TB and a second TB; receiving, from the second network node based on the information, the data message including the plurality of TBs, wherein the data message includes a feedback process ID associated with the plurality of TBs; and transmitting, to the second network node, DFI corresponding to the feedback process ID.

Aspect 26: The method of aspect 25, wherein transmitting the DFI further comprises: transmitting DCI including the DFI, wherein the DFI includes a first bit corresponding to the feedback process ID, and wherein the first bit indicates first feedback exclusively corresponding to the first TB.

Aspect 27: The method of aspect 26, wherein the DFI is a 16-bit bitmap, the 16-bit bitmap includes the first bit, and the 16-bit bitmap excludes any feedback corresponding to the second TB.

Aspect 28: The method of any of aspects 25 through 27, wherein transmitting the DFI further comprises: transmitting DCI including the DFI, wherein the DFI includes a first bit corresponding to the feedback process ID, and wherein the first bit indicates first feedback corresponding to the first TB and second feedback corresponding to the second TB.

Aspect 29: The method of aspect 28, wherein the first bit is a first value or a second value, the first value indicates the first feedback and the second feedback are each a respective ACK, and the second value indicates at least one of the first feedback or the second feedback is a NACK.

Aspect 30: The method of any of aspects 28 through 29, wherein the DFI includes a plurality of bits, the plurality of bits includes the first bit, each respective bit of the plurality of bits corresponds to a respective feedback process ID of a plurality of feedback process IDs, the plurality of feedback process IDs includes the feedback process ID associated with the plurality of TBs, and the plurality of feedback process IDs are all different.

Aspect 31: The method of any of aspects 28 through 30, wherein the first bit corresponds to a logical AND operation between the first feedback and the second feedback.

Aspect 32: The method of any of aspects 28 through 31, wherein the first bit corresponds to a logical OR operation between the first feedback and the second feedback.

Aspect 33: The method of any of aspects 25 through 32, wherein transmitting the DFI further comprises: transmitting DCI including the DFI, wherein the DFI includes a plurality of bits corresponding to the feedback process ID, wherein each respective bit of the plurality of bits indicates respective feedback corresponding to each respective TB of the plurality of TBs.

Aspect 34: The method of aspect 33, wherein a first bit of the plurality of bits indicates first feedback corresponding to the first TB and a second bit of the plurality of bits indicates second feedback corresponding to the second TB.

Aspect 35: The method of aspect 34, wherein the DFI is a 32-bit bitmap including the plurality of bits, the 32-bit bitmap includes the first bit and the second bit.

Aspect 36: The method of any of aspects 33 through 35, wherein the plurality of bits includes multiple sets of bits, each respective set of bits of the multiple sets of bits corresponds to a respective feedback process ID of a plurality of feedback process IDs, the plurality of feedback process IDs includes the feedback process ID associated with the plurality of TBs, and the plurality of feedback process IDs are all different.

Aspect 37: The method of aspect 36, wherein the multiple sets of bits includes a first set of bits and a second set of bits, wherein the first set of bits corresponds to the feedback process ID associated with the plurality of TBs, and wherein the second set of bits corresponds to a second feedback process ID, wherein the second feedback process ID is associated with a single TB, wherein the second set of bits includes a first bit and a second bit, wherein the first bit indicates feedback corresponding to the single TB associated with the second feedback process ID, and wherein the second bit is a null value or a default value; or the second network node is to ignore the second bit.

Aspect 38: The method of any of aspects 36 through 37, wherein a DCI format associated with both the DCI including the DFI and a scheduling DCI has a fixed size, the DCI including the DFI comprises a first quantity of bits, the scheduling DCI comprises a second quantity of bits, and the fixed size is equal to a greater of the first quantity of bits and the second quantity of bits.

Aspect 39: The method of any of aspects 36 through 38, wherein the plurality of bits includes the multiple sets of bits if a scheduling DCI comprises a quantity of bits equal to or greater than a total quantity of bits of the DCI including the multiple sets of bits.

Aspect 40: The method of any of aspects 25 through 39, further comprising: transmitting, from the second network node, configuration information via RRC signaling, wherein the configuration information is associated with the DFI.

Aspect 41: The method of any of aspects 25 through 40, further comprising: receiving UCI associated with the data message, wherein the UCI includes a plurality of NDI fields and a plurality of RV fields, wherein a respective NDI field of the plurality of NDI fields and a respective RV field of the plurality of RV fields correspond to a respective TB of the plurality of TBs.

Aspect 42: The method of aspect 41, wherein the UCI is a single UCI message, the method further comprising: decoding the UCI to obtain the single UCI message including the plurality of NDI fields and the plurality of RV fields.

Aspect 43: The method of aspect 42, further comprising: demultiplexing the single UCI message from one or more layers associated with one TB of the plurality of TBs, wherein receiving the UCI comprises receiving the single UCI message on the one or more layers.

Aspect 44: The method of any of aspects 42 through 43, further comprising: demultiplexing the single UCI message from a first set of one or more layers associated with the first TB of the plurality of TBs and from a second set of one or more layers associated with the second TB of the plurality of TBs, wherein receiving the UCI comprises receiving the single UCI message on the first set of one or more layers and on the second set of one or more layers.

Aspect 45: The method of any of aspects 41 through 44, wherein the UCI is a plurality of UCI messages, the method further comprising: decoding the UCI to obtain the plurality of UCI messages, wherein the plurality of UCI messages includes a first UCI message and a second UCI message, wherein the first UCI message includes a first NDI field of the plurality of NDI fields and a first RV field of the plurality of RV fields, and wherein the second UCI message includes a second NDI field of the plurality of NDI fields and a second RV field of the plurality of RV fields; and demultiplexing the first UCI message on a first set of one or more layers associated with the first TB and the second UCI message on a second set of one or more layers associated with the second TB, wherein receiving the UCI comprises receiving the first UCI message on the first set of one or more layers and the second UCI message on the second set of one or more layers.

Aspect 46: The method of aspect 45, wherein the first UCI message of the plurality of UCI messages associated with the first TB includes the first RV field, the first NDI field, a first feedback process ID field, and a first channel occupancy time sharing information field; and the second UCI message of the plurality of UCI messages associated with the second TB includes the second RV field, the second NDI field, a second feedback process ID field, and a second channel occupancy time sharing information field, wherein the second feedback process ID field and the second channel occupancy time sharing information field comprise same information as the first feedback process ID field and the first channel occupancy time sharing information field, respectively.

Aspect 47: The method of any of aspects 45 through 46, wherein the first UCI message of the plurality of UCI messages associated with the first TB includes the first RV field, the first NDI field, a first feedback process ID field, and a first channel occupancy time sharing information field; and the second UCI message of the plurality of UCI messages associated with the second TB exclusively includes the second RV field and the second NDI field.

Aspect 48: The method of any of aspects 25 through 47, wherein the data message is a CG-PUSCH transmission or a DG-PUSCH transmission.

Aspect 49: An apparatus for wireless communication at a first network node, comprising at least one processor; memory coupled with the at least one processor; and instructions stored in the memory and executable by the at least one processor to cause the apparatus to perform a method of any of aspects 1 through 24.

Aspect 50: An apparatus for wireless communication at a first network node, comprising at least one means for performing a method of any of aspects 1 through 24.

Aspect 51: A non-transitory computer-readable medium storing code for wireless communication at a first network node, the code comprising instructions executable by at least one processor to perform a method of any of aspects 1 through 24.

Aspect 52: A first network node for wireless communication, comprising a memory; and at least one processor coupled to the memory, wherein the at least one processor is configured to perform a method of any of aspects 1 through 24.

Aspect 53: An apparatus for wireless communication at a first network node, comprising at least one processor; memory coupled with the at least one processor; and instructions stored in the memory and executable by the at least one processor to cause the apparatus to perform a method of any of aspects 25 through 48.

Aspect 54: An apparatus for wireless communication at a first network node, comprising at least one means for performing a method of any of aspects 25 through 48.

Aspect 55: A non-transitory computer-readable medium storing code for wireless communication at a first network node, the code comprising instructions executable by at least one processor to perform a method of any of aspects 25 through 48.

Aspect 56: A first network node for wireless communication, comprising a memory; and at least one processor coupled to the memory, wherein the at least one processor is configured to perform a method of any of aspects 25 through 48.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the drawings, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network node for wireless communication, comprising:
   a memory; and
   at least one processor coupled to the memory, wherein the at least one processor is configured to:
      receive information that indicates that the network node is to transmit a data message using a plurality of transport blocks (TBs), wherein the plurality of TBs includes a first TB and a second TB;
      transmit, based on the information, the data message using the plurality of TBs, wherein the data message includes a feedback process identifier (ID) associated with the plurality of TBs; and
      receive downlink control information (DCI) including downlink feedback information (DFI), wherein the DFI includes a plurality of bits including a first bit, wherein the first bit indicates first feedback corresponding to the first TB and second feedback corresponding to the second TB, wherein each respective bit of the plurality of bits corresponds to a respective feedback process ID of a plurality of feedback process IDs, wherein the plurality of feedback process IDs includes the feedback process ID associated with the plurality of TBs, and wherein the plurality of feedback process IDs includes feedback process IDs that are different.

2. A network node for wireless communication, comprising:
   a memory; and
   at least one processor coupled to the memory, wherein the at least one processor is configured to:
      receive information that indicates that the network node is to transmit a data message using a plurality of transport blocks (TBs), wherein the plurality of TBs includes a first TB and a second TB;
      transmit, based on the information, the data message using the plurality of TBs, wherein the data message includes a feedback process identifier (ID) associated with the plurality of TBs; and
      receive downlink control information (DCI) including downlink feedback information (DFI), wherein the DFI includes a plurality of bits corresponding to the feedback process ID, wherein each respective bit of the plurality of bits indicates respective feedback corresponding to each respective TB of the plurality of TBs, wherein the plurality of bits includes multiple sets of bits, wherein each respective set of bits of the multiple sets of bits corresponds to a respective feedback process ID of a plurality of feedback process IDs, wherein the plurality of feedback process IDs includes the feedback process ID associated with the plurality of TBs, and wherein the plurality of feedback process IDs includes feedback process IDs that are different.

3. The network node of claim 2, wherein a first bit of the plurality of bits indicates first feedback corresponding to the first TB and a second bit of the plurality of bits indicates second feedback corresponding to the second TB.

4. The network node of claim 3, wherein the DFI is a 32-bit bitmap including the plurality of bits, wherein the 32-bit bitmap includes the first bit and the second bit.

5. The network node of claim 2, wherein the multiple sets of bits includes a first set of bits and a second set of bits, wherein the first set of bits corresponds to the feedback process ID associated with the plurality of TBs, and wherein the second set of bits corresponds to a second feedback process ID, wherein the second feedback process ID is associated with a single TB, wherein the second set of bits includes a first bit and a second bit, wherein the first bit indicates feedback corresponding to the single TB associated with the second feedback process ID, and wherein the second bit is a null value.

6. The network node of claim 2, wherein a DCI format associated with both the DCI including the DFI and a scheduling DCI has a fixed size, wherein the DCI including the DFI comprises a first quantity of bits, wherein the scheduling DCI comprises a second quantity of bits, and wherein the fixed size is equal to a greater of the first quantity of bits and the second quantity of bits.

7. The network node of claim 2, wherein the plurality of bits includes the multiple sets of bits if a scheduling DCI comprises a quantity of bits equal to or greater than a total quantity of bits of the DCI including the multiple sets of bits.

8. The network node of claim 2, wherein the multiple sets of bits includes a first set of bits and a second set of bits, wherein the first set of bits corresponds to the feedback process ID associated with the plurality of TBs, and wherein the second set of bits corresponds to a second feedback process ID, wherein the second feedback process ID is associated with a single TB, wherein the second set of bits includes a first bit and a second bit, wherein the first bit indicates feedback corresponding to the single TB associated with the second feedback process ID, and wherein the second bit is a default value.

9. The network node of claim 2, wherein the multiple sets of bits includes a first set of bits and a second set of bits, wherein the first set of bits corresponds to the feedback process ID associated with the plurality of TBs, and wherein the second set of bits corresponds to a second feedback process ID, wherein the second feedback process ID is associated with a single TB, wherein the second set of bits includes a first bit and a second bit, wherein the first bit indicates feedback corresponding to the single TB associated with the second feedback process ID, and wherein the at least one processor is configured to ignore the second bit.

10. The network node of claim 1, wherein the data message is a configured grant physical uplink shared channel (CG-PUSCH) transmission or a dynamic grant physical uplink shared channel (DG-PUSCH) transmission.

11. A network node for wireless communication, comprising:
a memory; and
at least one processor coupled to the memory, wherein the at least one processor is configured to:
receive information that indicates that the network node is to transmit a data message using a plurality of transport blocks (TBs), wherein the plurality of TBs includes a first TB and a second TB;
transmit, based on the information, the data message using the plurality of TBs, wherein the data message includes a feedback process identifier (ID) associated with the plurality of TBs;
receive downlink feedback information (DFI) corresponding to the feedback process ID;
encode uplink control information (UCI) to obtain a single UCI message including a plurality of NDI fields and a plurality of RV fields, wherein the UCI is associated with the data message, and wherein a respective NDI field of the plurality of NDI fields and a respective RV field of the plurality of RV fields correspond to a respective TB of the plurality of TBs; and
transmit the single UCI message.

12. The network node of claim 11, wherein the at least one processor is configured to:
multiplex the single UCI message on one or more layers associated with one TB of the plurality of TBs, wherein, to transmit the single UCI message, the at least one processor is further configured to transmit the single UCI message on the one or more layers.

13. The network node of claim 11, wherein the at least one processor is configured to:
multiplex the single UCI message on a first set of one or more layers associated with the first TB of the plurality of TBs and on a second set of one or more layers associated with the second TB of the plurality of TBs, wherein, to transmit the single UCI message, the at least one processor is further configured to transmit the single UCI message on the first set of one or more layers and on the second set of one or more layers.

14. A network node for wireless communication, comprising:
a memory; and
at least one processor coupled to the memory, wherein the at least one processor is configured to:
receive information that indicates that the network node is to transmit a data message using a plurality of transport blocks (TBs), wherein the plurality of TBs includes a first TB and a second TB;
transmit, based on the information, the data message using the plurality of TBs, wherein the data message includes a feedback process identifier (ID) associated with the plurality of TBs;
receive downlink feedback information (DFI) corresponding to the feedback process ID; and
encode uplink control information (UCI) to obtain a plurality of UCI messages, wherein the UCI includes a plurality of NDI fields and a plurality of RV fields, wherein the UCI is associated with the data message, wherein a respective NDI field of the plurality of NDI fields and a respective RV field of the plurality of RV fields correspond to a respective TB of the plurality of TBs, wherein the plurality of UCI messages includes a first UCI message and a second UCI message, wherein the first UCI message includes a first NDI field of the plurality of NDI fields and a first RV field of the plurality of RV fields, and wherein the second UCI message includes a second NDI field of the plurality of NDI fields and a second RV field of the plurality of RV fields;
multiplex the first UCI message on a first set of one or more layers associated with the first TB and the second UCI message on a second set of one or more layers associated with the second TB; and
transmit the first UCI message on the first set of one or more layers and the second UCI message on the second set of one or more layers.

15. The network node of claim 14, wherein:
the first UCI message of the plurality of UCI messages associated with the first TB includes the first RV field, the first NDI field, a first feedback process ID field, and a first channel occupancy time sharing information field; and
the second UCI message of the plurality of UCI messages associated with the second TB includes the second RV field, the second NDI field, a second feedback process ID field, and a second channel occupancy time sharing information field, wherein the second feedback process ID field and the second channel occupancy time sharing information field comprise same information as the first feedback process ID field and the first channel occupancy time sharing information field, respectively.

16. The network node of claim 14, wherein:
the first UCI message of the plurality of UCI messages associated with the first TB includes the first RV field, the first NDI field, a first feedback process ID field, and a first channel occupancy time sharing information field; and
the second UCI message of the plurality of UCI messages associated with the second TB exclusively includes the second RV field and the second NDI field.

17. A first network node for wireless communication, comprising:
a memory; and
at least one processor coupled to the memory, wherein the at least one processor is configured to:
transmit, to a second network node, information that indicates that the second network node is to transmit a data message using a plurality of transport blocks (TBs), wherein the plurality of TBs includes a first TB and a second TB;
receive, from the second network node based on the information, the data message including the plurality of TBs, wherein the data message includes a feedback process identifier (ID) associated with the plurality of TBs;
transmit, to the second network node, downlink feedback information (DFI) corresponding to the feedback process ID;
receive uplink control information (UCI) associated with the data message, wherein the UCI includes a plurality of new data indicator (NDI) fields and a plurality of redundancy version (RV) fields, wherein a respective NDI field of the plurality of NDI fields and a respective RV field of the plurality of RV fields correspond to a respective TB of the plurality of TBs; and
decode the UCI to obtain a single UCI message including the plurality of NDI fields and the plurality of RV fields.

18. The first network node of claim 17, wherein the at least one processor is configured to:
demultiplex the single UCI message from one or more layers associated with one TB of the plurality of TBs, wherein, to receive the UCI, the at least one processor is further configured to receive the single UCI message on the one or more layers.

19. The first network node of claim 17, wherein the at least one processor is configured to:
demultiplex the single UCI message from a first set of one or more layers associated with the first TB of the plurality of TBs and from a second set of one or more layers associated with the second TB of the plurality of TBs, wherein, to receive the UCI, the at least one processor is further configured to receive the single UCI message on the first set of one or more layers and on the second set of one or more layers.

20. The first network node of claim 17, wherein the data message is a configured grant physical uplink shared channel (CG-PUSCH) transmission or a dynamic grant physical uplink shared channel (DG-PUSCH) transmission.

21. A first network node for wireless communication, comprising:
a memory; and
at least one processor coupled to the memory, wherein the at least one processor is configured to:
transmit, to a second network node, information that indicates that the second network node is to transmit a data message using a plurality of transport blocks (TBs), wherein the plurality of TBs includes a first TB and a second TB;
receive, from the second network node based on the information, the data message including the plurality of TBs, wherein the data message includes a feedback process identifier (ID) associated with the plurality of TBs;
transmit, to the second network node, downlink feedback information (DFI) corresponding to the feedback process ID;
receive uplink control information (UCI) associated with the data message, wherein the UCI includes a plurality of new data indicator (NDI) fields and a plurality of redundancy version (RV) fields, wherein a respective NDI field of the plurality of NDI fields and a respective RV field of the plurality of RV fields correspond to a respective TB of the plurality of TBs;
decode the UCI to obtain a plurality of UCI messages, wherein the plurality of UCI messages includes a first UCI message and a second UCI message, wherein the first UCI message includes a first NDI field of the plurality of NDI fields and a first RV field of the plurality of RV fields, and wherein the second UCI message includes a second NDI field of the plurality of NDI fields and a second RV field of the plurality of RV fields; and
demultiplex the first UCI message on a first set of one or more layers associated with the first TB and the second UCI message on a second set of one or more layers associated with the second TB, wherein, to receive the UCI, the at least one processor is configured to receive the first UCI message on the first set of one or more layers and the second UCI message on the second set of one or more layers.

22. The first network node of claim 21, wherein:
the first UCI message of the plurality of UCI messages associated with the first TB includes the first RV field, the first NDI field, a first feedback process ID field, and a first channel occupancy time sharing information field; and
the second UCI message of the plurality of UCI messages associated with the second TB includes the second RV field, the second NDI field, a second feedback process ID field, and a second channel occupancy time sharing information field, wherein the second feedback process ID field and the second channel occupancy time sharing information field comprise same information as the first feedback process ID field and the first channel occupancy time sharing information field, respectively.

23. The first network node of claim 21, wherein:
the first UCI message of the plurality of UCI messages associated with the first TB includes the first RV field, the first NDI field, a first feedback process ID field, and a first channel occupancy time sharing information field; and
the second UCI message of the plurality of UCI messages associated with the second TB exclusively includes the second RV field and the second NDI field.

* * * * *